(12) United States Patent
Arato et al.

(10) Patent No.: US 7,662,295 B2
(45) Date of Patent: Feb. 16, 2010

(54) METHOD FOR REMOVING ORGANIC MATERIAL IN OILFIELD PRODUCED WATER AND A REMOVAL DEVICE THEREFOR

(75) Inventors: Toshiaki Arato, Hitachinaka (JP); Hidehiro Iizuka, Mito (JP); Akira Mochizuki, Mito (JP); Tomoko Suzuki, Hitachinaka (JP); Akio Honji, Hitachinaka (JP); Shigesaburo Komatsu, Ishioka (JP); Hisashi Isogami, Ushiku (JP); Hiroshi Sasaki, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/718,524

(22) PCT Filed: Nov. 1, 2005

(86) PCT No.: PCT/JP2005/020073
§ 371 (c)(1),
(2), (4) Date: May 3, 2007

(87) PCT Pub. No.: WO2006/049149
PCT Pub. Date: May 11, 2006

(65) Prior Publication Data
US 2008/0023401 A1 Jan. 31, 2008

(30) Foreign Application Priority Data

Nov. 5, 2004 (JP) ............................. 2004-321782
Mar. 25, 2005 (JP) ............................. 2005-087480

(51) Int. Cl.
*C02F 3/00* (2006.01)
(52) U.S. Cl. .................. 210/762; 210/765; 210/670; 210/671; 210/695; 210/748; 210/223
(58) Field of Classification Search .............. 210/693, 210/762, 765, 670–671, 695, 748, 223
See application file for complete search history.

(56) References Cited

U.S. PATENT DOCUMENTS 3,132,091 A * 5/1964 Young ................... 208/111.35

(Continued)

FOREIGN PATENT DOCUMENTS

CA 2246169 3/1990

(Continued)

OTHER PUBLICATIONS

"Tyler Mesh Scale," Handbook of Chemistry and Physics, Chemical Rubber Company, 88th Edition, 2007-2008, p. 15-38.*

(Continued)

*Primary Examiner*—Chester T Barry
(74) *Attorney, Agent, or Firm*—Antonelli, Terry, Stout & Kraus, LLP.

(57) ABSTRACT

A method and an apparatus for removing dissolved organic substances from an oily water obtained as a by-product from an oilfield, characterized in that an oily water obtained as a by-product from an oilfield by separating a crude oil from a crude oil/brine mixture is brought into contact with an adsorbent to adsorptively remove organic substances dissolved in the water containing oil suspended therein and that the adsorbent is regenerated.

19 Claims, 9 Drawing Sheets

U.S. PATENT DOCUMENTS

| | | | | |
|---|---|---|---|---|
| 4,302,323 | A | * | 11/1981 | Chen .......................... 208/89 |
| 4,482,459 | A | | 11/1984 | Shiver |
| 4,855,521 | A | * | 8/1989 | Avidan et al. ................ 585/415 |
| 5,104,545 | A | * | 4/1992 | Means et al. ................. 210/650 |
| 5,614,100 | A | * | 3/1997 | Gallup ........................ 210/665 |
| 5,730,882 | A | * | 3/1998 | Gallup et al. ................ 210/708 |
| 5,851,378 | A | * | 12/1998 | Vogt et al. ............. 208/111.01 |
| 6,294,077 | B1 | * | 9/2001 | Dougherty et al. ............ 208/27 |
| 6,706,196 | B2 | * | 3/2004 | Holland ...................... 210/695 |
| 2004/0206705 | A1 | | 10/2004 | Vignola et al. |

FOREIGN PATENT DOCUMENTS

| | | | |
|---|---|---|---|
| CN | 1141263 | | 3/2002 |
| CN | 1433977 | | 8/2003 |
| EP | 0 432 787 B1 | | 6/1991 |
| EP | 432787 A1 | * | 6/1991 |
| JP | 57-030546 | | 2/1982 |
| JP | 59-228904 | | 12/1984 |
| JP | 60-501495 | | 9/1985 |
| JP | 01-155946 | | 6/1989 |
| JP | 02-122885 | | 5/1990 |
| JP | 08-253313 | | 10/1996 |
| JP | 11-253931 | | 9/1999 |
| JP | 2000-093957 | | 4/2000 |
| JP | 2000-140828 | | 5/2000 |
| JP | 2001-170622 | | 6/2001 |
| JP | 2003-047826 | | 2/2003 |
| JP | 2003-144805 | | 5/2003 |
| JP | 2003-326264 | | 11/2003 |
| JP | 2004-066209 | | 3/2004 |
| JP | 2004-255290 | | 9/2004 |
| JP | 2004-275884 | | 10/2004 |
| JP | 2004-533322 | | 11/2004 |
| WO | WO 84/04913 | | 12/1984 |
| WO | WO 03/002461 A1 | | 1/2003 |

OTHER PUBLICATIONS

L. Riviere, et al., "Experience of Produced Water Treatment in the North Sea", Marine Pollution Bulletin, vol. 29, Nos. 6-12, pp. 312-316, 1994.

Translation of the International Preliminary Report on Patentability for International Application No. PCT/JP2005/020073 dated May 18, 2007.

Chinese Official Action mailed Jan. 23, 2009, for Chinese Patent Application No. 200580036851.0.

Russian Official Action issued Apr. 9, 2009, for Application No. 2007 117 763.

Canadian Official Action dated Oct. 5, 2009, for Application No. 2,586,487.

* cited by examiner

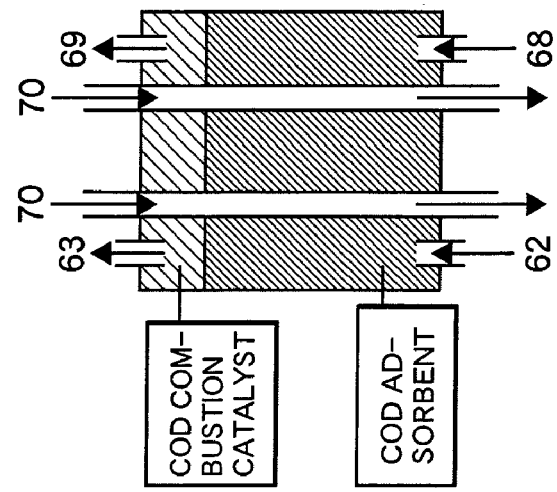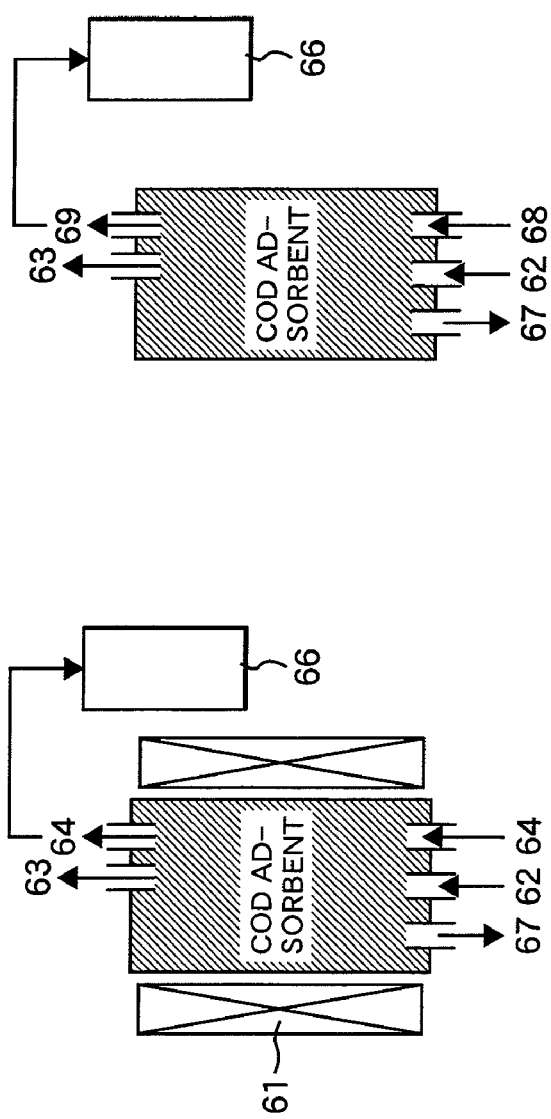

METHOD FOR REMOVING ORGANIC MATERIAL IN OILFIELD PRODUCED WATER AND A REMOVAL DEVICE THEREFOR

TECHNICAL FIELD

The present invention relates to a treatment process and a treatment device for oil field produced water which is separated and produced from a mixture of crude oil and salt water in an oil field and, specifically, relates to a method and a device for effectively removing an organic material, such as oil droplets etc., included in oil field produced water and dissolved organic compounds.

BACKGROUND ART

A mixture in a state where crude oil is mixed with salt water is mined in an oilfield area, and oilfield produced water is formed by separating crude oil and salt water from this mixture. Since the oil field produced water contains a considerable amount of oil droplets and dissolved organic compounds, there is a fear that returning it to the sea, the lakes and marshes will bring about the destruction of the environment.

Conventionally, various methods have been discussed to separate and remove the oil contained in oilfield produced water which is produced in an oilfield area. For instance, in JP-A No. 2003-144805, it is disclosed that the oil contained in oilfield produced water is made into an emulsion, and a magnetic floc is form by adding magnetic powder and a coagulant therein, and the magnetic floc is separated by magnetic aspiration.

Moreover, "Experience of Produced Water Treatment in the North Sea, Marine Pollution Bulletin, Vol. 29, No. 6-12, (1994), p. 312-316" describes that oil droplets are separated by using a liquid cyclone.

However, even when oil droplets in the oilfield produced water are removed, a considerable amount of organic compounds, for instance, acetic acid, propionic acid, and valeric acid, etc. are dissolved in the oilfield produced water and they become a reason for the bad small and the damage to the environment, so that a removal technique has been discussed. The index to measure the content of the aforementioned dissolved organic compound is a value called the COD (chemical oxygen demand). Therefore, the dissolved organic compound associated with the aforementioned oilfield goes by the name of COD element.

In JP-A No. 2004-275884, it is described that activated carbon powder is added to the oilfield produced water to absorb the COD elements and the activated carbon powder congregates and is separated by adding a coagulant.

In JP-A No. 2004-255290, it is described that an organic polymer coagulant is added to the oilfield produced water and, moreover, the oil content is decomposed by adding a polymer coagulant and an oxidant. It is also described that excess oxidant is absorbed and removed by using activated carbon, and that hypochlorous acid, etc. formed by electrodialysis is used for an oxidant.

The technologies described in the various aforementioned well-known documents have a problem from the viewpoint of suitable treatment of the oil content in the oilfield produced water and the dissolved organic compounds which will be a problem hereafter and treatment of the separated organic compound. For instance, a large amount of sediment becomes a serious problem in a method for precipitating the activated carbon, on which an organic material is adsorbed, by using a coagulant. Though the oil content may be decomposed to a certain point by using an oxidant such as hypochlorous acid, etc., it is not clear that the dissolved organic compound can be effectively decreased.

In JP-A NO. 2000-93957, a technology is disclosed in which water including a small amount of organic material, such as drinking water, etc. is purified by using a water purification film which contains a zeolite. However, it is not a technology which processes very poor water which contains a large amount of oil and organic compounds such as the oilfield produced water.

[Patent Document 1] JP-A No. 2003-144805
[Patent Document 2] JP-A No. 2004-275884
[Patent Document 3] JP-A No. 2004-255290
[Patent Document 4] JP-No. 2000-093957
[Non-patent Documents 1] Experience of Produced Water Treatment in the North Sea, Marine Pollution Bulletin, Vol.29, No. 6-12, (1994), p. 312-316

DISCLOSURE OF THE INVENTION

Problems to be Solved by the Invention

Therefore, a method and a device for treating oilfield produced water in which the oil content and the dissolved organic compounds contained in the oilfield produced water are effectively separated and removed, and in which the load on the facility, the cost, and the burden on the environment, etc, are lower in subsequent treatments.

Means for Solving the Problems

The present invention provides a method and a device for effectively removing the oil content and the dissolved organic compounds by performing an oil separation treatment of oilfield produced water which is obtained by separating crude oil from a mixture of crude oil and salt water mined from an oilfield, and by bringing the aforementioned oilfield produced water into contact with an absorbent which absorbs and removes the dissolved organic compounds in oilfield produced water to which an oil removal treatment is performed.

BRIEF DESCRIPTION OF THE DRAWINGS

FIGS. 3 are a sectional schematic drawing illustrating an adsorption tower with an outer heating furnace used in the present invention.

DESCRIPTION OF REFERENCE NUMERALS

Figure 1:
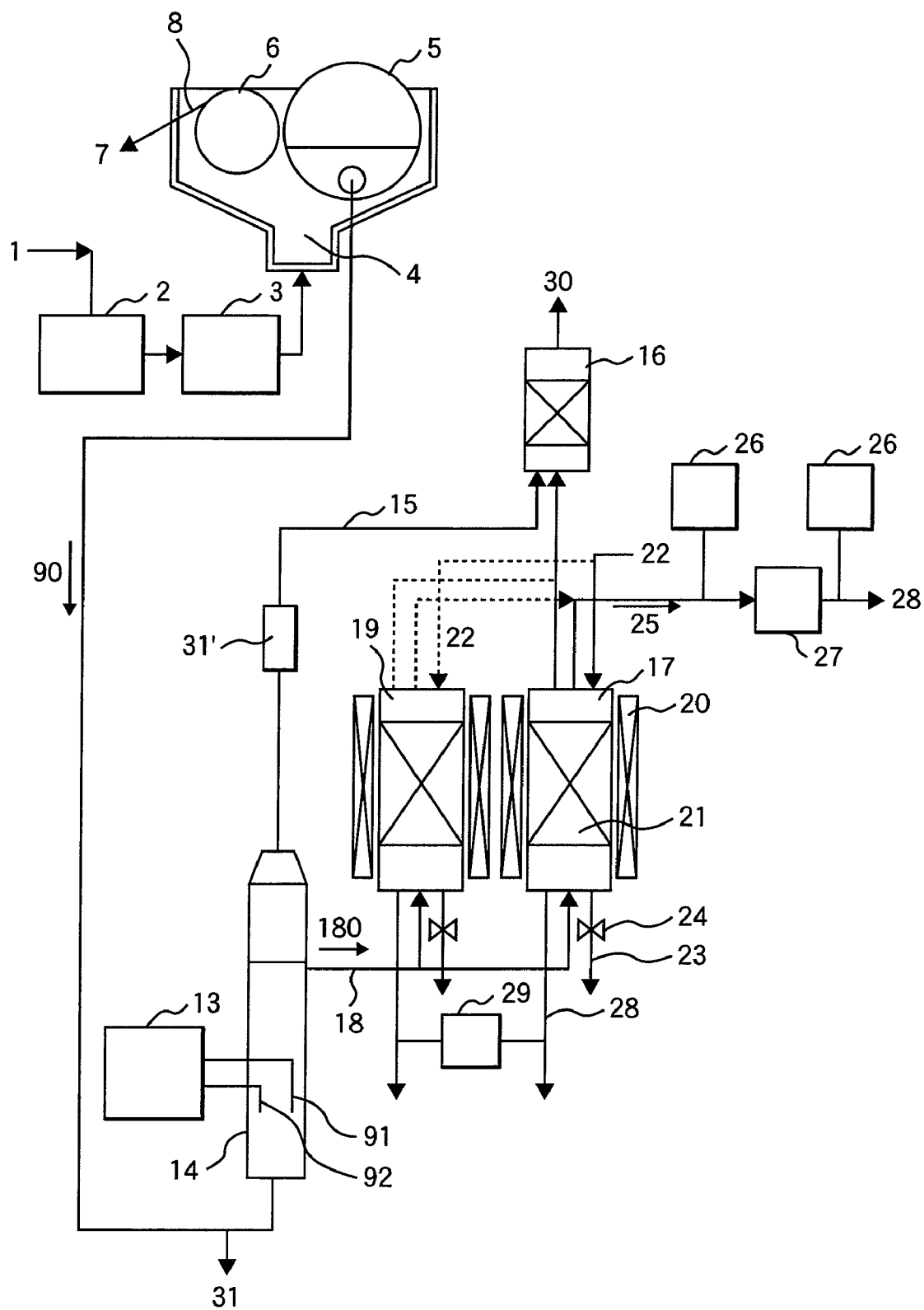
FIG. 1 is a diagram illustrating an outline configuration of a treatment system of oilfield produced water by the first embodiment of the present invention.

1: oilfield produced water, 2: Raw water tank, 3: coagulation tank, 4: rotary filter device, 5: rotary filter film, 6: rotary cylinder, 7: floc, 8: scraping plate, 10: drainage treatment device, 11: magnetic separation device, 13: potential generation device, 14: electrolytic bath, 15: exhaust pipe, 16: exhaust combustion tower, 17, 19: adsorption tank, 18: drainage supply tube, 20: heating furnace, 21: adsorbent, 22: hot-air blower, 23: drain tube, 24: drain valve, 25: second treated water, 26: CODmonitor, 27: reservoir, 28: ventilation tube, 29: moisture meter, 30: duct, 31: gas analyzer, 91, 92: electrode, 180: second treated water.

BEST MODE FOR CARRYING OUT THE INVENTION

The present invention is one where oil droplets, etc. in oilfield produced water are removed and dissolved organic compounds associated with the water are adsorbed and removed, and a magnetic separation method is especially suitable as a method for removing the oil droplets, etc. Moreover, although adsorption and removal using an adsorbent are necessary as methods for removing a dissolved organic compound, electrolysis, etc. may be used as a treatment before the adsorption treatment. Hereinafter, some items for the methods of adsorption and removal which are important in the present invention will be described in detail.

[I] Example of the Dissolved Organic Compound Contents

Table 1 shows the contents of the salts and dissolved organic compounds which are contained in produced water in a typical crude oil produced in Japan. Moreover, Table 2 shows the components and concentrations of produced water in a typical crude oil produced in a foreign country. The kind and contents change in every sort of way depending on the oilfield. Normal and/or iso-butyric acid and normal and/or iso-valeric acid are the agents responsible for the bad smell.

TABLE 1

| Component | Molecular formula | Concentration (mg/L) Analytical value |
|---|---|---|
| Sodium chloride | NaCl | 16000 |
| Acetic acid | $CH_3COOH$ | 1970 |

TABLE 1-continued

| Component | Molecular formula | Concentration (mg/L) Analytical value |
|---|---|---|
| Propionic acid | $CH_3CH_2COOH$ | 400 |
| n-butyric acid | $CH_3(CH_2)_2COOH$ | 78 |
| iso-butyric acid | $(CH_3)_2CHCOOH$ | 430 |
| n-valeric acid | $CH_3(CH_2)_3COOH$ | 15 |
| iso-valeric acid | $(CH_3)_2CHCH_2COOH$ | 78 |
| Acetone | $CH_3COCH_3$ | 2 |
| Phenol | $C_6H_5OH$ | 12 |
| Cresol | $C_6H_4(CH_3)OH$ | 8 |
| Methyl ethyl ketone | $(CH_3)_2CH_2CO$ | 0.3 |
| Benzene | $C_6H_6$ | 0.28 |
| Toluene | $C_6H_5CH_3$ | 0.06 |

TABLE 2

| Component | Molecular formula | Concentration (mg/L) Analytical value |
|---|---|---|
| Sodium chloride | NaCl | 21000 |
| Acetic acid | $CH_3COOH$ | 12000 |
| Propionic acid | $CH_3CH_2COOH$ | 2420 |
| n-butyric acid | $CH_3(CH_2)_2COOH$ | 110 |
| iso-butyric acid | $(CH_3)_2CHCOOH$ | 460 |
| n-valeric acid | $CH_3(CH_2)_3COOH$ | 110 |
| iso-valeric acid | $(CH_3)_2CHCH_2COOH$ | 1840 |
| Acetone | $CH_3COCH_3$ | 5 |
| Phenol | $C_6H_5OH$ | 14 |
| Cresol | $C_6H_4(CH_3)OH$ | 12 |
| Methyl ethyl ketone | $(CH_3)_2CH_2CO$ | 0.8 |
| Benzene | $C_6H_6$ | 1.5 |
| Toluene | $C_6H_5CH_3$ | 0.8 |

[II] Comparison of COD Treatment Methods

When the effectiveness was confirmed through experiments on various COD removal treatment methods, the following results were obtained. That is, it is understood that there is a problem regarding practical use except for a method using an easy-regeneration-type inorganic adsorbent such as a zeolite adsorbent which is used in the present invention.

(1) Activated sludge process; organisms are damaged by the effects of chlorine. The treatment time is long.
(2) Addition of sodium hypochlorite; there is little COD decrease effect.
(3) Hypochlorite generation (electrolysis); there is little COD decrease effect.
(4) Fenton oxidation; there is little COD decrease effect.
(5) Vacuum concentration (distillation); Only the material having a boiling temperature substantially different from water can be separated. The treatment of condensate is a problem.
(6) Activated carbon; Regeneration is difficult although COD can be decreased. The cost is high because a large amount of activated carbon is necessary.

The characteristics of a preferable easy-regeneration-type inorganic adsorbent used in the present invention are as follows.
(a) Adsorption capacity is large.
(b) Adsorption and desorption rates are great.
(c) Regeneration is possible. (Consumption of the adsorbent is small according to the regeneration.)
(d) Mechanical strength is sufficiently great.
(e) Pore size of the adsorbent is appropriate.
(f) Surface property of the adsorbent is suitable for an adsorption material of the object.

In an embodiment of a specifically preferable COD removal process in the present invention, removal is possible by combining an oil-water separation method, an electrolysis method, and an adsorptive removal method using the adsorption characteristics of the COD element of synthetic zeolite. Moreover, the adsorptivity can be easily recovered to be almost the same as before use by thermal regeneration even after a water-soluble organic compound element is sufficiently adsorbed and the adsorptivity becomes lower, so that the operation is not complicated and the cost for drainage treatment can be reduced.

In the present invention, it is desirable that a proton-type zeolite be used for an adsorbent. Specifically, it is desirable that synthetic zeolite be used in which the silica/alumina ratio is high being five or more by the molar ratio. The synthetic zeolite where the silica/alumina ratio is high has excellent hydrophobic properties, and it is suitable for selectively adsorbing organic elements inside drainage.

The operation of the COD removal device is managed and used by considering the amount of water to be treated, the amount of adsorbent, and the adsorption treatment time per unit adsorption tower, etc. to make the COD value of the treated water lower than 120 mg/L which is a standard of the drainage regulation. In a COD removal method and a device thereof in the embodiment of the present invention, the aforementioned variety of data is stored in the storage part of the controller, and the method and the device are controlled according to the data, if necessary.

A treatment device of produced water in an embodiment of the present invention does not need large-scale equipment etc. and the device itself can be made compact in spite of it being able to process an element to a high degree, such as organic solvents, etc. contained in the oilfield produced water regardless of the concentration, so that the oilfield produced water can be treated at low cost.

As already mentioned, various organic elements are dissolved in oilfield produced water and they become agents responsible for the increase in COD. A problem to be solved in the present invention is that the COD of such oil separated water is decreased to be lower than the standard of the drainage. Moreover, it is to provide a COD removal system where the adsorption activity and the durability are maintained for a long time.

It can be achieved by using a carbonaceous adsorbent (activated carbon) and an inorganic adsorbent as an adsorbent where an organic solvent is removed from oilfield produced water by adsorption. However, there is a problem that activated carbon is not easy to be regenerated although it has excellent adsorptivity, and it is important to make use of a method which can solve the problem.

The COD elements associated with water in typical crude oil produced in Japan are acetone, methyl ethyl ketone, acetic acid, propionic acid, butyric acid, valerianic acid, trichloroethylene, tetrachloroethylene, benzene, toluene, ethylbenzene, xylene, phenol, cresol, xylenol, hexachlorobenzene, carbon disulfide, methanol, succinic acid, and lactic acid, etc.

Adsorptivity of the synthetic zeolite for the aforementioned COD elements has uniqueness. The many kinds of synthetic zeolites can be used together as a mixture or in combination. Specifically, by combining adsorbents having different cavity diameters (pore sizes), from an organic compound having small molecular weight to an organic compound having large molecular weight, they can be effectively adsorbed. For instance, an organic compound having small molecular weight such as acetic acid is adsorbed by an adsorbent having small pore size and an organic compound having large molecular weight such as valeric acid and an aromatic compound is adsorbed by an adsorbent having large pore size. This is because there is a possibility that a compound having a molecular weight which can not be adsorbed by one kind of adsorbent remains in the produced water. Thus, it is understood that the COD element can be effectively removed in stages by adsorbing the element for which each adsorbent is best, even when a plurality of adsorption towers filled with adsorbent are arranged in parallel or in series against the flow of water to be processed, or when adsorbents having different pore sizes are mixed and packed in one adsorption tower.

As far as the shape of the adsorbent, consideration is given to a variety, and there are molded bodies such as powder shapes, particle shapes, pellet shapes, rod shapes, fiber shapes, plate shapes, honeycombs, and tube-forms, etc. From the viewpoint of economy and environmental protection, it is extremely important that the adsorbent used is regenerated and used repeatedly. Therefore, the adsorbent is used in a shape and a way of use where it is easily regenerated. For instance, even when it is in a shape such as a powder shape, particle shape, and pellet shape, it is important that they are easily separated from the water to be treated and a regeneration treatment is applied. Therefore, these various shapes of adsorbents are installed in the adsorption tower by sandwiching them between meshes and porous plates so that they are not discharged from the adsorption tower and are easily separated from the water to be treated. In the case of other shapes, an installation method is adopted which takes the regeneration into consideration.

According to the present invention, a device for treating oilfield produced water is provided which comprises an oil-water separation tank where the oil content and undissolved particles floating and suspended in the drainage are removed, an electrolytic bath where molecules of an organic element are decomposed in the first treated water passing through the oil-water separation tank, an adsorption removal tank where an organic element is adsorbed and removed from the second treated water passing through the electrolytic bath, and a combustion chamber where the organic compound eliminated from the adsorption removal agent which is filled in the adsorption removal tank is burned and exhausted.

According to the present invention, a device for treating oilfield produced water is provided which comprises an oil-water separation tank where the oil content and undissolved particles floating and suspended in the drainage are removed, an electrolytic bath where molecules of an organic element are decomposed in the first treated water passing through the oil-water separation tank, a separation removal tank where an organic element is separated and removed from the second treated water passing through the electrolytic bath, an adsorption removal tank where an organic element is adsorbed and removed from the third treated water passing through the electrolytic bath, and a combustion chamber where the organic element separated and removed in the separation removal tank and the organic element separated and removed in the adsorption removal tank are mixed, burned, and exhausted. The aforementioned oil-water separation tank is preferably a magnetic separation tank.

Moreover, an inorganic adsorption removal agent is preferable as an adsorption removal agent used for the aforementioned adsorption removal tank. A natural zeolite or a synthetic zeolite is preferable for the aforementioned inorganic adsorbent, where the crystal structure including silica and aluminum oxide is zeolite and the ratio of silica and aluminum is 5 or more as a $SiO_2/Al_2O_3$ mole ratio. Specifically, a synthetic zeolite having excellent hydrophobic property is preferable. Moreover, one is preferable for the aforementioned inorganic adsorbent, in which at least one element from silica, aluminum oxide, and sodium oxide is included, the ratio of silica and aluminum oxide is 5 or more in the mole ratio of $SiO_2/Al_2O_3$, and the adsorbent includes at least one element selected from the group of Pt, Pd, Ru, Rh, Ni, Fe, Cu, Mn, and Co.

Furthermore, it is preferable that an inorganic adsorption removal agent be used which, after adsorbing and removing the organic elements, be repeatedly regenerated by heating at 100° C. to 600° C. under atmospheric atmosphere.

The aforementioned separation removal tank may be a separation removal tank where a volatile organic compound can be separated and removed by aerating the first treated water.

Moreover, the present invention provides a treatment method comprising a magnetic separation process where the oil content and undissolved particles floating and suspended in the drainage is removed, an electrolysis process where the magnetically separated oilfield produced water is electrolyzed, a separation removal process where volatile organic compounds are separated and removed from the second treated water from the aforementioned electrolysis process, an adsorption removal process where an organic element is adsorbed and removed from the third treated water discharged from the separation removal tank, a process where volatile organic compounds discharged along with steam from the separation removal tank and is burned and exhausted.

In addition to using, in combination, a magnetic separation device, an aeration tank, an evaporation concentration device, a hypochlorous acid reaction device and/or an electrolytic device in accordance with the COD value of the oilfield produced water which is the raw material, a method for removing the COD element by using an adsorption technique is preferable in which a catalytic adsorbent is used until the COD value finally becomes lower than the environmental standard value of a drainage and, therefore, zeolite is suitable for the catalytic adsorbent. Among these, synthetic zeolite is effective, having specifically a high silica/alumina ratio and hydrophobic properties.

Although the catalytic adsorption treatment method is relatively easy to systemize, the life and regeneration frequency of the catalyst have a strong relationship with the process cost. Therefore, in addition to its properties being important, it is also important that regeneration of the adsorbent be easy as well.

In order to regenerate the adsorbent on which organic materials such as organic solvents, etc. are absorbed, there is an effective method for removing them by using a heating method, a so called dry heating method, where the adsorbed carbon element is oxidized and burned. However, there is a limit to how often the regeneration can be repeated because the carbon system adsorbent itself burns and is consumed, so that there is a disadvantage that an efficient COD removal system cannot be built because a device for replenishing the spent material is necessary. Moreover, in the case of an ocean oilfield, it is preferable that the supply of adsorbent for recharging be avoided as much as possible from the viewpoint of transportation costs.

According to the present invention, a COD element in oilfield produced water can be removed by an adsorption technique using a zeolite as an adsorbent, and the most important characteristic is that the deterioration of the adsorption properties by the material to be adsorbed can be recovered by combustion and decomposition in atmosphere.

As mentioned above, among the zeolites, synthetic zeolite is specifically suitable for a material which uses the feature of the present invention, and synthetic zeolite is the most suitable among those where the $SiO_2/Al_2O_3$ ratio is 5 or more in the mole ratio, and it has hydrophobic properties. Specifically, ZSM-5 is an absorbent which is suitable for the purpose of the invention.

When the carbon element caused by the adsorbed organic material remains as is on the surface of the adsorbent, the surface activity of the adsorbent is decreased. Therefore, when the activity of the adsorbent is decreased, the activity has to be recovered by removing the carbon element.

The organic material adsorbed on the adsorbent remains as a carbon element. The carbon element can not generally be removed unless it is heated at 600° C. or more. However, sodium chloride in the same concentration as seawater is dissolved in the actual oilfield produced water. Therefore, when there is repeated regeneration at 600° C., $SiO_2$ which is a main component of the zeolite reacts with Na in sodium chloride for a short time, resulting in the deterioration in its function as an adsorbent. Heating at a temperature that is as low as possible below 600° C. is desirable.

By supporting a catalytic element the organic material on the surface of the adsorbent can be decomposed, oxidized, and burned at a temperature of 500° C. or less, and under the best conditions at a low temperature of 400° C. or less, and the adsorbent can be recovered to an original active state.

According to the present invention, it is possible to reduce the concentration of organic elements in oilfield produced water at a low cost of operation as well as to control the consumption of the adsorbent compared with the prior art.

Moreover, the present invention has an advantage superior to a conventional method in the following points. Specifically, synthetic zeolite is used for a main component of the adsorbent and the organic materials adsorbed on the surface of the adsorbent is oxidized and burned by using a catalytic effect of the catalytic element supported on the surface of the synthetic zeolite, resulting in the adsorptivity being recovered at the same level as that before use.

The catalytic element is selected from the group of noble metals such as Pt, Pd, Rh, Au, and Ag, etc. and transition metals such as Fe, Ni, Mn, and Co, etc. have a similar effect.

Since the regeneration operation can be done only by removing the treated water while the absorbent is filled, there are no complications operationally, and there is also an advantage from the viewpoint of reducing the drainage treatment cost.

Synthetic zeolite is made to come into contact with oilfield produced water for the purpose of removing the COD element from the oilfield produced water. As a result, it could be decreased to a COD concentration, which is less than the target emission regulation demonstrated or less by the adsorptivity. The activity of one where the adsorptivity is deteriorated by extended duration use can be recovered by burning and removing the carbon element originating from the organic materials by heating the adsorbent. Therefore, it is effective to repeatedly remove the COD elements in oilfield produced water for a long time.

Specifically, an adsorbent where a catalytic element is supported on the surface of a synthetic zeolite maintains its adsorptivity, and it is possible to oxidize and decompose the adsorbed organic elements and to oxidize and burn the carbon elements only by heating at a relatively low temperature of 500° C. or less.

EMBODIMENT

Hereinafter, the present invention will be described in further detail referring to the embodiments. In the embodiment of the invention, the performance was evaluated by using the following techniques.

Evaluation of Adsorptivity

An adsorbent weighing precisely 1.0 g is put into a 100 mL beaker. 100 mL of oilfield produced water is precisely measured and put into the beaker. A stirrer is put inside and mixing occurs by using a magnetic stirrer in order to allow adsorption for a predetermined time. After this is finished, in the case when fine particles cannot be separated, the fine particles are promptly separated from the treated water by using a centrifugal separator, and the liquid is supplied for analysis. The liquid is supplied to the COD analysis after the adsorbent is quickly separated from the liquid by using a centrifugal separator.

Measurement of COD Concentration in the Drainage

COD was measured by chemical oxygen demand ($COD_{Mn}$) using potassium permanganate of the JIS K 0102 test method of industrial wastewater.

Quantitative Analysis of Acetic Acid and Propionic Acid in the drainage

Quantity of the concentration of acetic acid and propionic acid was carried out by ion chromatography.

First Embodiment

Hereinafter, the embodiment of the present invention will be described referring to FIG. 1. A drainage treatment device which is one embodiment in the present invention includes a magnetic separation device which separates the oil content in oilfield produced water, an electrolytic bath 14, a COD adsorption tank 17, and an exhaust combustion tower 16.

The operation of the drainage treatment device will be explained as follows. First, oilfield produced water 1 is stored in a raw water tank 2. Oil is emulsified and dispersed in oilfield produced water. Extremely fine mud, sand, and other solid materials are included in oilfield produced water except for an organic element and an inorganic ion represented by sodium. Therefore, oilfield produced water 1 is sent to a coagulation tank 3 and a treatment where the suspended matter is allowed to aggregate to produce floc is carried out by using a coagulant such as iron 2 sulfate and poly aluminum chloride, etc. and magnetic particles such as magnetite ($Fe_3O_4$) and γ-hematite ($Fe_2O_3$), etc.

Raw water including the floc is sent to a rotary filter device 4 and the oil content is separated from the floc. A rotary filter film 5 and a rotary cylinder 6 are provided in the rotary filter device 4, and a magnetic field generation device such as an electromagnet is placed inside the rotary cylinder 6 although it is not shown in the figure. The raw water is filtered by the rotary filter film 5, and the oil content and floc 7 are separated from the raw water. The oil content and floc which accumulates over the rotary filter film 5 are removed from the rotary cylinder 6 by spraying cleaning water and scraping it off using a scraping plate 8, and they are discharged to outside of the rotary filter device 11. The filtrate water 90 is sent to the electrolytic bath 14.

Electrodes 91 and 92 are placed in the electrolytic bath 14. Electrodes 91 and 92 are connected to a potential generation device 13. After coming into the electrolytic bath 14, the organic material in the filtrate water 90 is decomposed by continuously electrolyzing it to become organic materials having smaller molecular weight. Since a high concentration of sodium chroride is dissolved in oilfield produced water, there is an advantage in the progress of electrolytic reaction. The components of exhaust gas in the electrolytic bath 14 are analyzed by using a gas analyzer 31'.

The hydrocarbon generation reaction takes place by establishing a current flow in the electrolytic bath 14 and a volatile organic element is formed. Consequently, it is exhausted from an exhaust pipe 15 for collecting the volatile organic elements located in the upper part of the electrolytic bath 14. The exhaust combustion tower 16 for burning and removing the volatile organic element is placed at the tip of the exhaust pipe 15, and the flue gas is discharged into the atmosphere from the duct 30.

According to the analysis, the volatile organic element discharged from the electrolytic bath 14 was a saturated hydrocarbon group such as ethane, ethylene, and cyclopropane, etc. In the electrolytic bath 14, the preferable material for the electrode which is used for electrolysis is Fe, Ni, Al, Au, Pt, and SUS. When it is an electrode material where high current density can be obtained, a reaction occurs in which hydrocarbon is mainly formed by combining two molecular weights of carboxylic acid with two protons. A high current density condition is desirable for this, and it is understood from the investigation of the inventors that Pt or a material which is covered by Pt as a thin film is suitable among the aforementioned electrode materials.

It is not necessary to complete the electrolytic reaction in the electrolytic bath 14, so that the filtrate water 90 can flow into the electrolytic bath 14 continuously. The organic elements which are not decomposed in the electrolytic bath 14 and the organic elements where decomposition progresses halfway are sent to either of the COD adsorption tanks 17 or 19 as elements in the second treated water 180 through a drainage supply tube 18.

The COD adsorption tank includes a first COD adsorption tank 17 and a second COD adsorption tank 19. The first COD adsorption tank 17 is used for a regular operation and the second COD adsorption tank 19 is installed as a reserve, or the first and second adsorption tanks are alternatively used. Therefore, the configurations of the first COD adsorption tank and the second COD adsorption tank are same. The configuration of the whole adsorption tank will be described as follows referring to the first COD adsorption tank 17.

Although two COD adsorption tanks are provided in the present invention, more adsorption tanks may be provided. Particles of ZSM-5 which is a kind of synthetic zeolite are filled as the adsorbent 21. A catalytic element is supported beforehand on the particles of ZSM-5. In the case of this embodiment, the Ni element is supported so that it becomes 0.5 wt % converted on per unit weight of ZSM-5. In addition to ZSM-5, mordenite has a similar adsorptivity as the components of the adsorbent 21.

The container of the COD adsorption tank of this embodiment has a cylindrical shape and is made of SUS 304. The material of the container of the COD adsorption tank is not limited to SUS 304. The COD adsorption tank 17 is placed inside of the heating furnace 20 and has a structure where the adsorbent 21 can be heated with the COD adsorption tank 17. A hot-air blower 22 and a drain tube 23 are installed in the COD adsorption tank 17. The drain tube 23 is placed under the adsorption tank with the drain valve 24.

When the adsorptivity of the adsorbent is deteriorated, the flow line of the water to be treated is switched to the adsorption tank 19 and water in the COD adsorption tank 17 is drained by opening the drain valve 24 of the adsorption tank 17. Next, hot-air of about 100 to 120° C. is blown into the COD adsorption tank 17 by operating the hot-air blower 22 to dry the adsorbent 21. A structure which discharges from the lower section of the COD adsorption tank by ventilating from the upper part is preferable.

The water content of the adsorbent 21 in the whole COD adsorption tank 17 is decreased to 10% or less by ventilating for about 30 minutes using the hot-air blower 22. The ventilation time depends on the tank length of the COD adsorption tank 17 and the ventilation temperature, so that it is not limited to this embodiment.

In order to control and manage the water content of the adsorbent, a moisture meter 29 may be provided in the ventilation tube 28 under the adsorption tank. The second treated water 25 passing through the COD adsorption tank 17 is discharged 28 after being stored once in the reservoir 27. COD monitors 26 are provided before and after the reservoir and, especially, are used for management of the COD value (COD≦120 mg/L) of the drainage.

A hot-air blower may be used for raising the temperature to the same level instead of the aforementioned heating furnace 20. In that case, it is preferable that the atmosphere of the hot-air have atmospheric constituents.

FIGS. 3 are a structural example illustrating an adsorption tower used in the embodiment of the present invention. FIG. 3A is one where an electric furnace or a microwave furnace 61 is arranged around the adsorption tower in which the COD adsorbent is filled. The raw water (including COD) 62 is supplied from the bottom of the adsorption tower and exhausted from the adsorption tower as the treated water 63. The remaining water in the tower 67 is discharged during regeneration of the adsorption tower, and the air for combustion 64 is supplied from the bottom of the adsorption tower, and then the flue gas (including $CO_2$, CO, CH) 65 is introduced into a combustion chamber 66 and burnt.

Although FIG. 3B is almost the same as FIG. 3A, high temperature air or high temperature gas (T≦600° C.) 68 is supplied from the bottom of the adsorption tower without installing a heating furnace around the adsorption tower. The flue gas 69 is introduced into the combustion chamber 66.

FIG. 3C is a drawing where the gas turbine exhaust 70 is supplied from the top of the adsorption tower, the combustion air 68 is supplied from the bottom of the adsorption tower, and the flue gas 69 is exhausted. These configurations of the adsorption tower are examples, and it is needless to say that it can be applied to cases other than that in the above-mentioned embodiment.

Second Embodiment

The second embodiment is an example of a test result using the device shown in the first embodiment.

Table 3 show measurement results of the $COD_{Mn}$ value in the electrolysis process and the adsorption process.

TABLE 3

| | Treatment process | $COD_{Mn}$ | Acetic acid | Propionic acid | Methanol |
|---|---|---|---|---|---|
| First treated water | Oil-water separation | 386 | 1740 | 390 | — |
| Second treated water | Electrolysis | 270 | 1200 | 222 | 150 |
| Third treated water | Adsorption treatment | 110 | 410 | 90 | 70 |

Unit: mg/L

The first treated water in Table 3 means the results of analysis where the sample was taken at the first treated water sampling intake 31 in FIG. 1. The second treated water is one which is treated by applying an electric field using the electric charging device 13 between the electrodes 91 and 92 placed in the electrolytic bath 14 of the electrodialysis device. Although it is not shown in FIG. 1, the analytical sample can be taken at the midway point of the drainage supply tube 18, and they are the results of analysis of the collected second treated water 180.

After passing through the electrolysis device, the $COD_{Mn}$ value decreased by 116 mg/L. The concentration of acetic acid and the concentration of propionic acid decreased by 540 mg/L and about by 170 mg/L, respectively. Conversely, methanol is formed and the concentration thereof becomes 150 mg/L. Thus, the result in which an electric field was applied to oilfield produced water and the concentration of the organic acid in oilfield produced water changed indicates that the Kolbe reaction had progressed.

The reason why the $COD_{Mn}$ is decreased by electrolysis is that acetic acid becomes gaseous and released in atmosphere from the second treated water by generating ethane $C_2H_6$ according to the Kolbe reaction shown in the expression (1).

$$2CH_3COO^- + 2(+) \rightarrow CH_3CH_3 + 2CO_2 \quad (1)$$
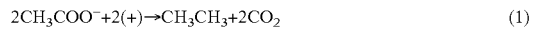

Herein, (+) means a proton.

An increase in the concentration of ethane was observed in the result which was analyzed using a gas analyzer 31 placed at the midway point of the exhaust pipe 15 installed at the top of the electrolytic bath 14.

The results in which methanol was formed in the aforementioned embodiment of the invention indicates that the reaction shown in the expression (2) had progressed.

$$CH_3COO^- + OH^- + 2(+) \rightarrow CH_3OH + CO_2 \quad (2)$$
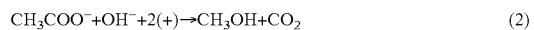

Although the material of the electrodes 91 and 92 used in the invention are Pt (platinum), it is not necessary that the entire electrode be formed of Pt. The same results can be obtained by using SUS, Fe, Al, and Ti, etc. where Pt is coated over the surface. A method for covering the surface with SUS, Fe, Al, and Ti is an ion plating technique, an evaporation technique, or a sputtering technique, and any of these materials is effective as an electrode material.

Next, the adsorbent 21 will be explained. As a result of the experiment done by the inventors, the following are confirmed as features of the adsorbent 21. The molar ratio of $SiO_2/Al_2O_3$ is preferably 5 or more as an element of the adsorbent and the molar ratio of $SiO_2/Al_2O_3$ is preferably 80 or more in order to adsorb water-soluble organic materials in oilfield produced water. In the case when a comparison is done of the kind of the organic material which is adsorbate, there is a tendency that the absorbed amount decreases with an increase in the carbon number of the organic material. Therefore, it is desirable that the opening diameter of the pore contributing to adsorption be from 0.5 to 0.6 nm and the pore contributing to adsorption be formed in a three-dimensional structure.

Any shape, such as a particle shape and a powder shape, presents no problem as an adsorbent filled in the adsorption tower when it has the aforementioned adsorptivity. However, there is a concern that the flow path is not dispersed during the transport of water in the case when it has a powder shape, and it results in a pressure drop buildup in the thermal regeneration process. Then, it is preferable that the powder shaped adsorbent be molded beforehand in a particle shape, or the adsorbent be supported on a carrier such as a honeycomb, etc. and placed in the COD adsorption removal tank.

Figure 5:
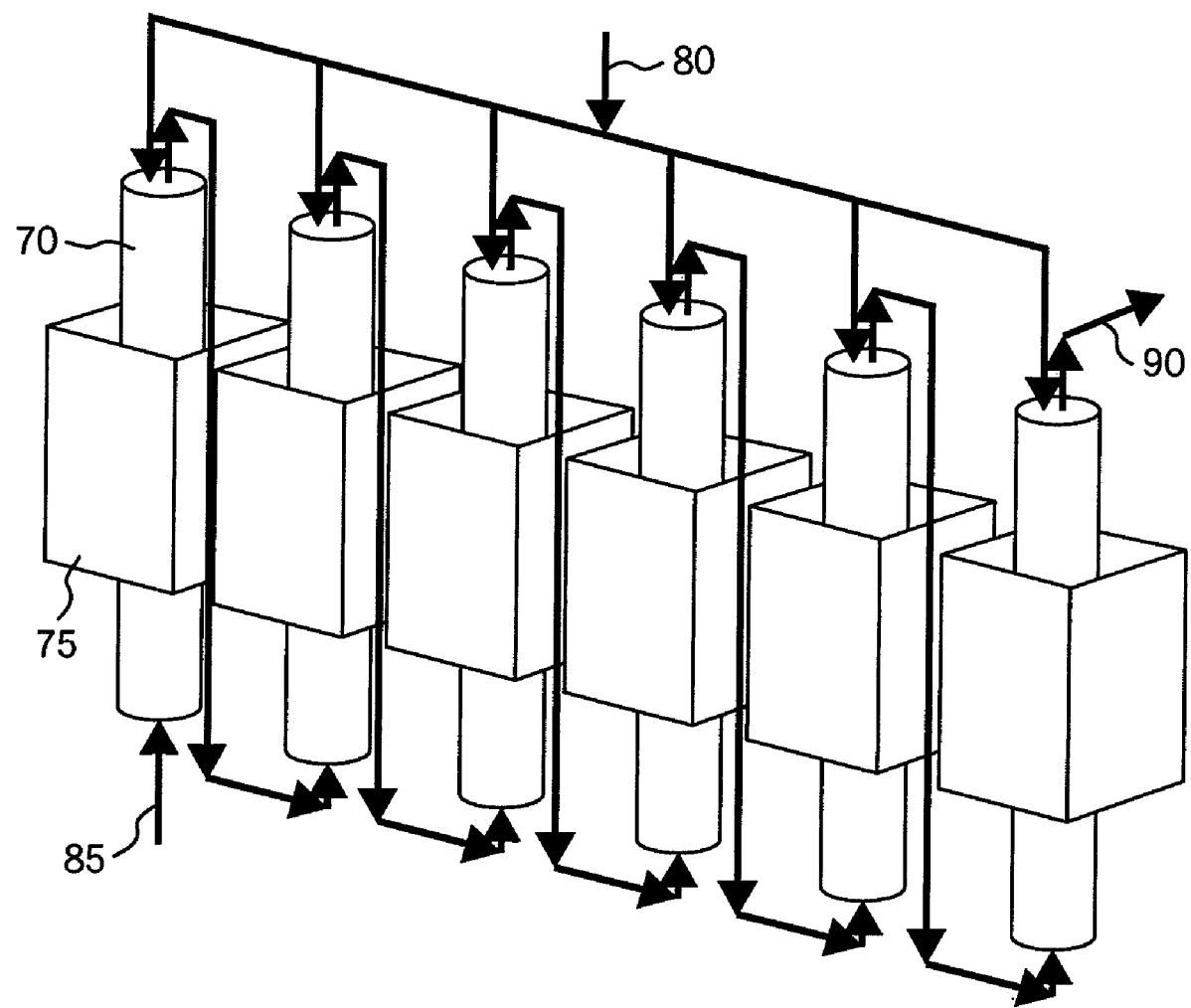
FIG. 5 is a sketch drawing illustrating a configuration example of an adsorption tower in a treatment system of an embodiment in the present invention.

FIG. 5 is a concrete example of an adsorption tower in the embodiment of the present invention. In the figure, a plurality of COD adsorption towers 70 are arranged in series against the flow of the produced water 85 and the treated water 90 is discharged from the top of the last adsorption tower. Each adsorption tower 70 comprises a heating furnace 75 which is used for the regeneration of the adsorbent. Moreover, each adsorption tower comprises a hot-air blower system 80 for drying the adsorbent during regeneration.

Third Embodiment

Figure 6:
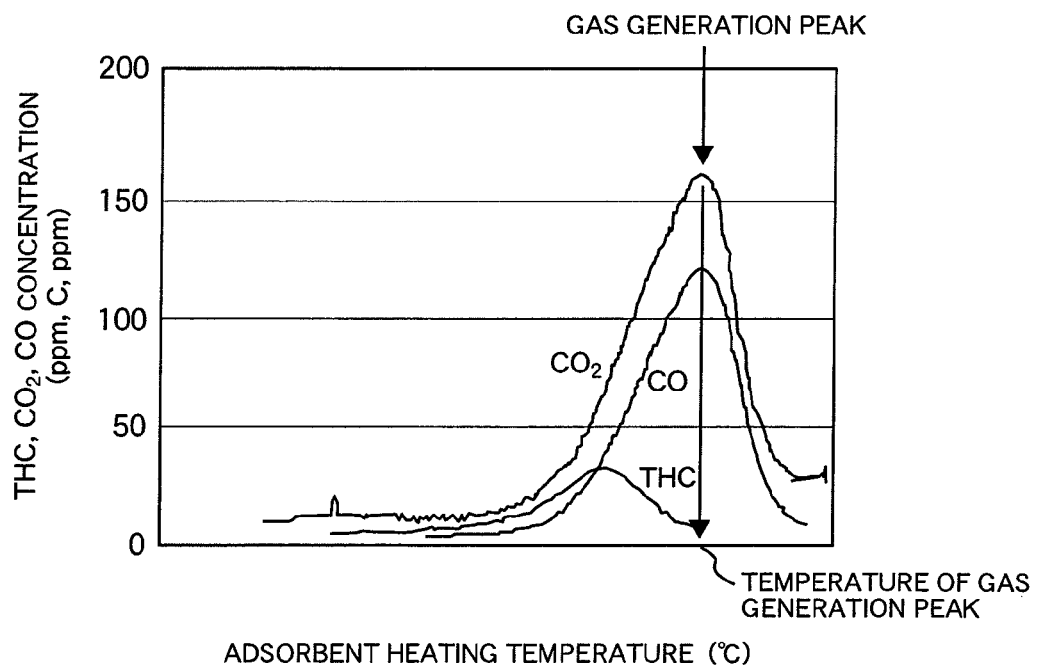
FIG. 6 is a graph illustrating a relationship between the heating temperature of the adsorbent and the concentration of the carrier gas element during temperature-programmed desorption of the adsorbent used in the present invention.

FIG. 6 shows a result of the regeneration of the adsorbent in the present invention. That is, it is a figure showing the relationship between the heating temperature and the amount of $CO_2$, CO and hydrocarbon generated from the adsorbent during repeated regeneration.

As shown in FIG. 6, the most appropriate kind of catalytic element and concentration range thereof can be determined by adsorbing under the same conditions by using the adsorbent on a variety of concentrations of catalytic elements, carrying out the temperature programmed desorption test under the same conditions, and comparing the temperature of the gas generation peaks of $CO_2$ and/or CO.

The test condition to obtain the results shown in FIG. 6 will be explained as follows. Synthetic zeolite ZSM-5 where the $SiO_2/Al_2O_3$ ration was 90 was used as an adsorbent. First, 5.0 g of the adsorbent was put into a 200 mL beaker and 50 mL of the second treated water of oilfield produced water is put therein and stirred for ten minutes. This operation corresponds to the adsorption process. Then, only the adsorbent is collected by performing a solid-liquid separation operation by using a centrifugal separator. This adsorbent is dried by heating in atmosphere at about 100° C.

Figure 7:
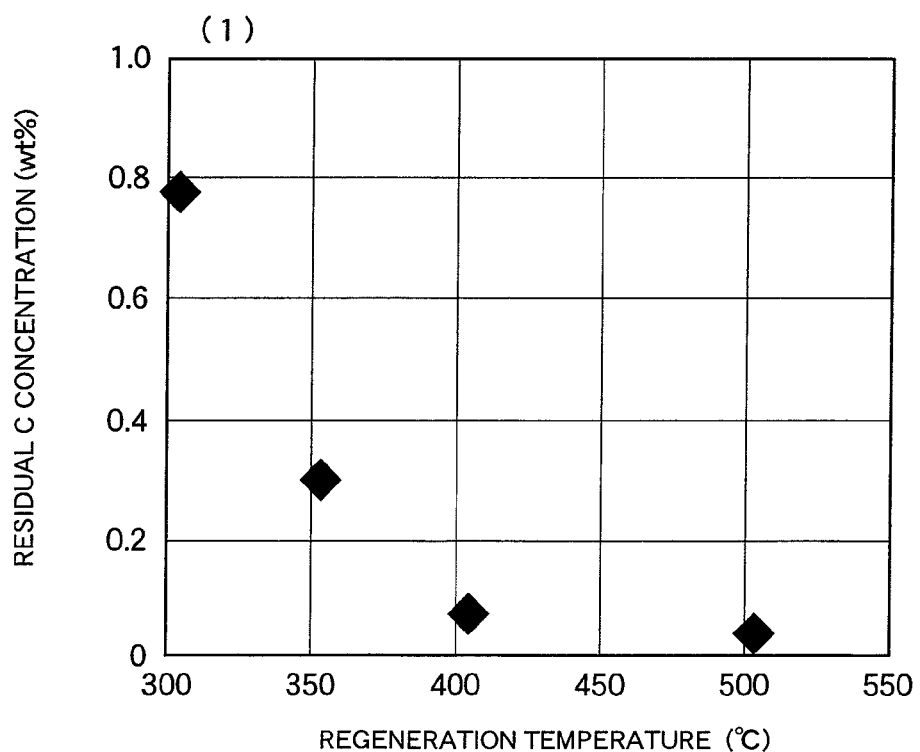
FIG. 7 is a graph illustrating a relationship between the regeneration temperature of the absorbent used in the present invention on which a catalytic element is supported and the carbon concentration remaining in the adsorbent after regeneration.
Figure 8:
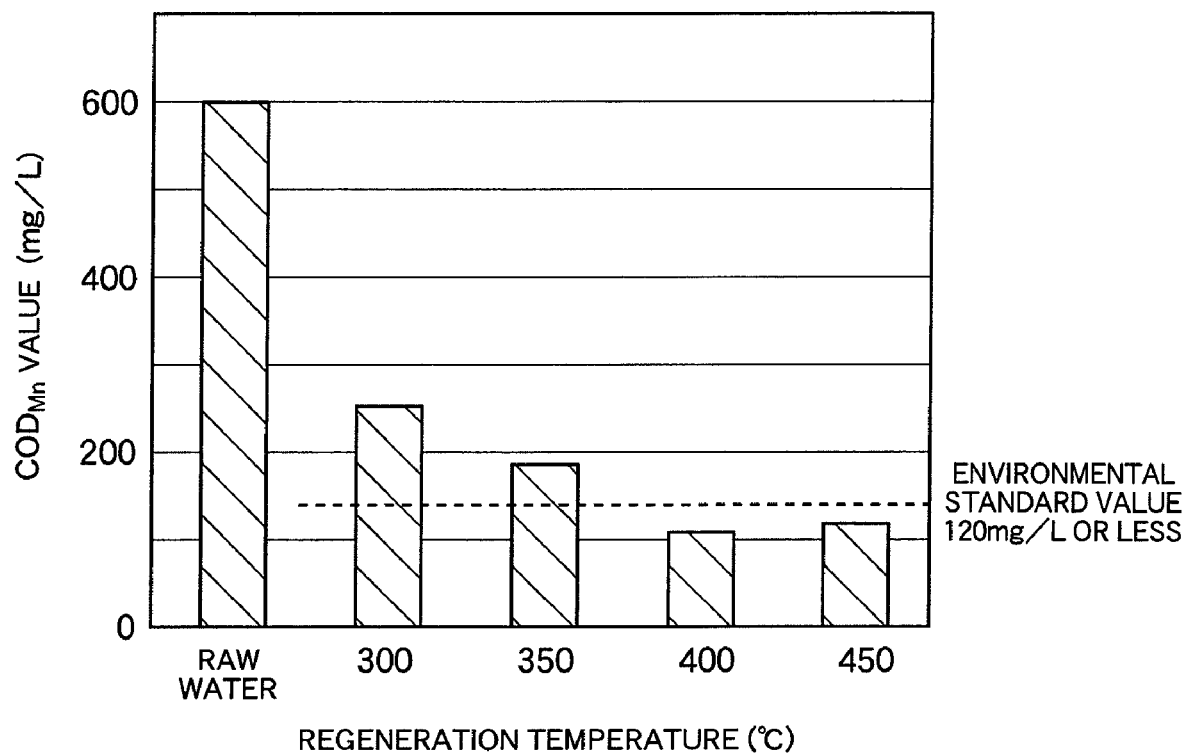
FIG. 8 is a graph illustrating a relationship between the regeneration temperature of the adsorbent used in the present invention and the $COD_{Mn}$ value before and after adsorption.

The adsorptivity is evaluated by using the following techniques in FIG. 7 and FIG. 8. 300 mL of oilfield produced water is measured and put into a beaker, and the adsorbent precisely weighed is put therein. After corking tightly, it is sufficiently reacted by shaking the mixture or rotating the mixture for a predetermined time. After the reaction is complete, the adsorbent is quickly filtered and separated from the treated water. In the case when fine particles can not be separated, the fine particles are separated from the treated water by using a centrifugal separator. As mentioned above, the obtained liquid is analyzed.

Next, FIG. 7 shows the residual carbon concentration in the adsorbent and adsorptivity of the regenerated adsorbent when it is heated in air with a heating rate of 10° C. per minute.

The adsorbent is one where Pt is catalyzed by being supported on zeolite with a weight ratio of 0.2 wt %. Zeolite consists of ZSM-5 particles molded by an extrusion technique to have a diameter of 3 mm and a length of 5 to 20 mm. Using dinitrodiamine Pt (II) nitrate solution as a raw material, Pt was supported by immersing the aforementioned ZSM-5 particles in Pt solution diluted with refined water to be the aforementioned concentration.

After the Pt solution was evenly adhered to and impregnated in all particles, the water was evaporated at 120° C. and it was heated at 600° C. for one hour in atmosphere after evaporating the water completely.

In the beaker oilfield produced water comes into contact with the catalyzed adsorbent formed by the aforementioned method, and it was stirred for ten minutes. The COD value of oilfield produced water before being put into the beaker was 600 mg/L. The stirring period was determined after it had been confirmed that the COD value of the water after the treatment hardly changed after ten minutes or more. After the stirring was over, the adsorbent was separated from the treated water; the adsorbent was dried using a hot-air blower and heated at 300 to 500° C. for one hour; and the carbon concentration in the adsorbent was quantitatively analyzed after heating.

The horizontal axis of FIG. 7 is the heating temperature of regeneration of the catalyzed adsorbent, and it is corresponded to the regeneration temperature of the adsorbent in the present invention. The value of the vertical axis is the residual carbon concentration in the adsorbent. When the regeneration temperature is 400° C. or less, the residual carbon concentration is 0.1 wt % or more. On the other hand, when it is 400° C. or more, the residual carbon concentration is 0.1 wt % or less. FIG. 8 is a graph in which is shown how much the residual carbon affects the adsorptivity as a function of the change of the $COD_{Mn}$ value of the oil pollution water. On the vertical axis are the COD values of the treated water after performing the adsorption reaction ten times and regenerating the oilfield produced water ten times. The $COD_{Mn}$ value of the raw water was 600 mg/L and the COD value was decreased by adsorption using a ZSM-5 particle adsorbent which has been repeatedly regenerated at 300° C. and 350° C. However, they did not satisfy the environmental standard value which is $COD_{Mn} \leq 120$ mg/L. When the regeneration temperature was 400° C. and 500° C., the concentration of the raw water, 600 mg/L, decreased to 105 to 110 mg/L, which satisfied the environmental standard value. It is considered that it becomes difficult to adsorb the COD elements in the raw water and the adsorptivity is decreased because the carbon concentration which remains unburnt on the surface of the adsorbent is high when the regeneration is performed at 350° C. or less. According to FIG. 8, regeneration which satisfies the environmental standard value becomes possible when the regeneration is performed at about 380° C.

According to the aforementioned embodiment of the present invention, there is a regeneration process to maintain the adsorptivity of the adsorbent while adsorbing the COD elements in oilfield produced water using the adsorbent, so that it becomes possible to remove the COD elements for a long time.

Fourth Embodiment

Figure 9:
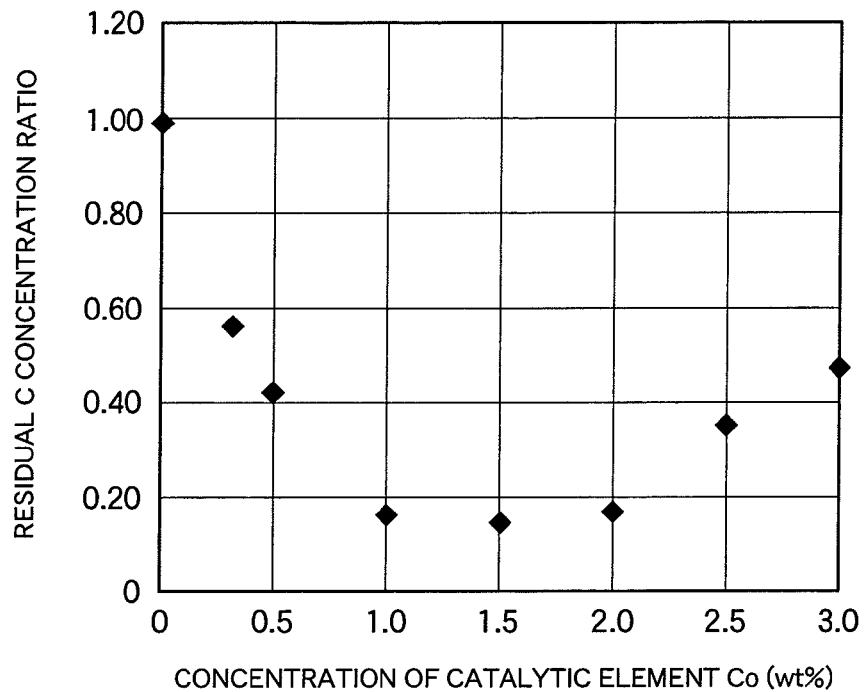
FIG. 9 is a graph illustrating a relationship between the concentration of a catalytic element Co and the residual carbon concentration after using an adsorbent on which Co is supported and after thermal regeneration at 400° C. for one hour.
Figure 10:
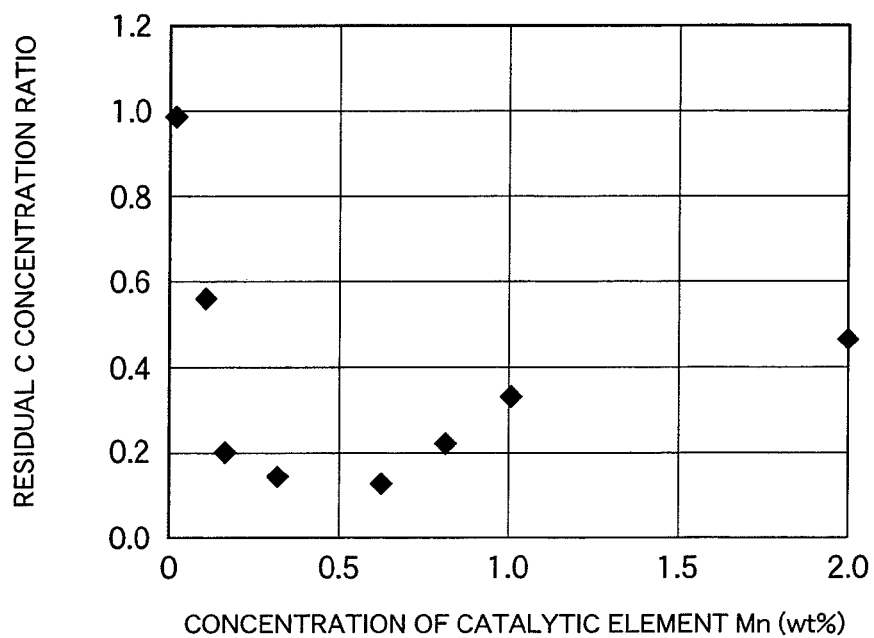
FIG. 10 is a graph illustrating a relationship between the concentration of a catalytic element Mn and the residual carbon concentration after using an adsorbent on which Mn is supported and after thermal regeneration at 400° C. for one hour.

FIG. 9 shows a result when the appropriate content of the Co content is determined for Co which is one kind of catalytic element for the adsorbent.

The adsorbent is one where the Co is supported up to a maximum of 3 wt % of the zeolite weight ratio. The zeolite is ZSM-5 particles molded by an extrusion technique to have a diameter of 3 mm and a length of 5 to 10 mm. Using a cobalt nitrate hexahydrate solution as a raw material, Co was supported by immersing the aforementioned ZSM-5 particles in a Co solution diluted with the refined water to the aforementioned catalyzed concentration.

After the Co solution was evenly adhered to and impregnated in all the particles, the water is evaporated at 100 to 120° C. and it was heated at 600° C. for one hour in air after evaporating the water completely.

In the beaker oilfield produced water comes into contact with the Co impregnated adsorbent formed by the aforementioned method and it was stirred for ten minutes. The COD value of oilfield produced water before being put into the beaker was 450 mg/L. The stirring period was assumed to be 10 minutes for the same reason as the embodiment. After stirring was over, the adsorbent was separated from the treated water; the adsorbent was dried in a constant-temperature drying oven heated at 400° C. for one hour in air; and the carbon concentration remaining in the adsorbent was quantitatively analyzed after heating.

The horizontal axis of FIG. 9 shows the Co concentration which was supported on the ZSM-5 carrier. The vertical axis shows the ratio of residual C concentration in the adsorbent. The denominator of the residual C concentration ratio in the vertical axis is the residual C concentration in the adsorbent after adsorption by an adsorbent (ZSM-5 particles) which does not contain the catalytic element Co, drying, and heating at 400° C. for one hour.

As is evident from FIG. 9, the most effective range of the concentration as the catalytic element is obtained when the residual C concentration ratio is the lowest. Therefore, in order to support Co on ZSM-5 particles as a catalytic element, it is understood that the amount of supported Co is preferably about 1 to 2 wt %.

In the case when the catalytic element was Mn, it was recognized that there exists a Mn concentration range where the residual C concentration becomes lowest, the same as the results for Co. In the case of Mn, the appropriate concentration range for regenerating the adsorbent was from 0.3 to 0.6 wt %.

Fifth Embodiment

Figure 2:
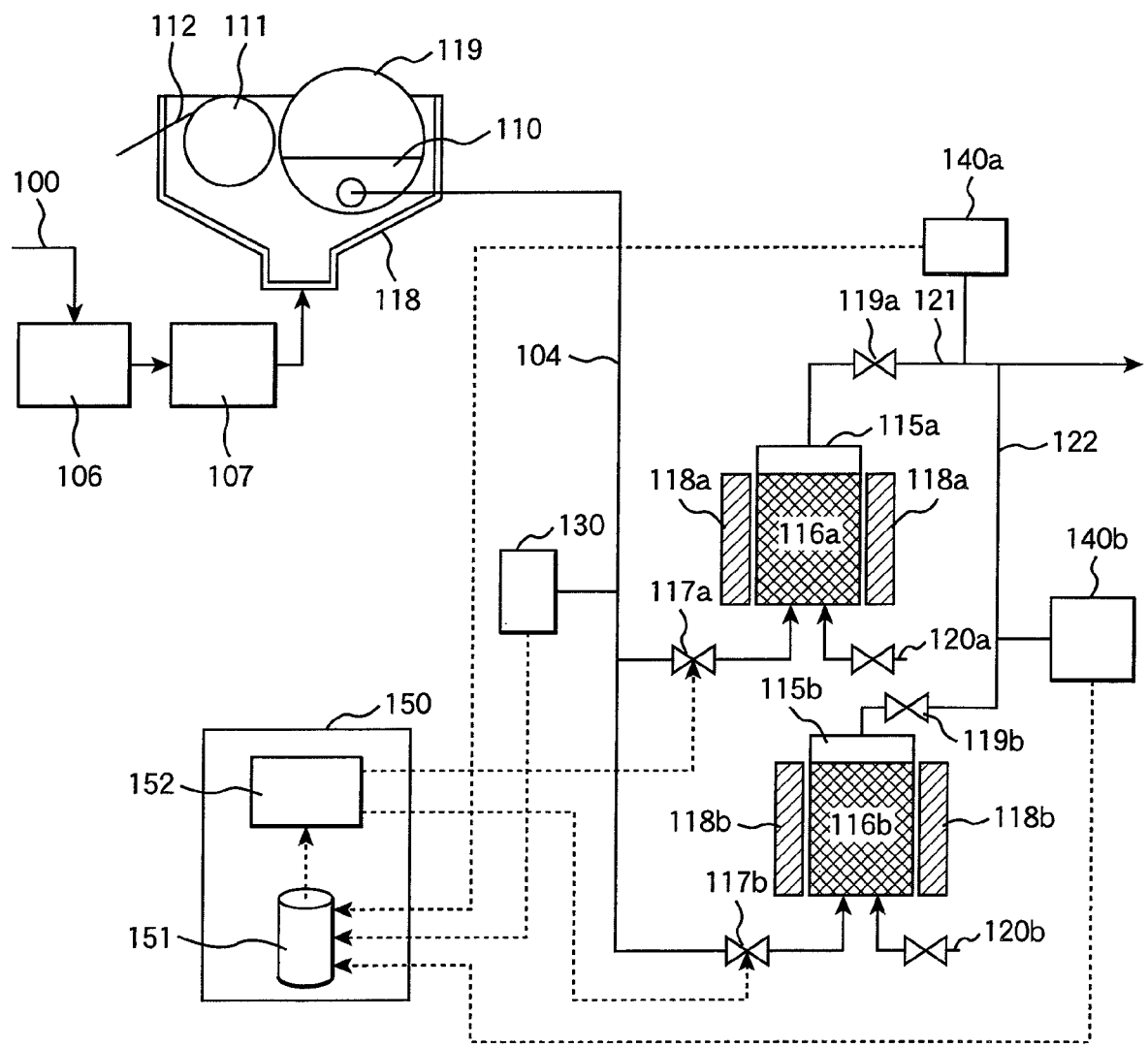
FIG. 2 is a diagram illustrating an outline configuration of a treatment system of oilfield produced water by another embodiment of the present invention.

An embodiment applying a drainage treatment system to the treatment of oilfield produced water in an oil mining well will be explained using FIG. 2. However, the present invention is not limited thereto. In the treatment system for oilfield produced water shown in FIG. 2, oilfield produced water 100 is stored in a raw water tank 106. Oil is emulsified and dispersed in oilfield produced water. Extremely fine mud, sand, and other solid materials are included except for an organic element and sodium. Therefore, raw water which is oilfield produced water is sent to a coagulation tank 107 and a treatment where the suspended matter is allowed to aggregate to produce floc is carried out by using a coagulant such as iron (II) sulfate and poly aluminum chloride, etc. and magnetic particles such as magnetite ($Fe_3O_4$) and γ-hematite ($Fe_2O_3$), etc. Raw water including the floc is sent to a rotary filter device 108 and the oil content is separated from the floc.

A rotary filter film 109 and a rotary cylinder 111 are provided in the rotary filter device 108, and a magnetic field generation device such as an electromagnet is placed inside of the rotary cylinder 111 although it is not shown in the figure. The raw water is filtered by the rotary filter film 109, and the oil content and floc are separated from the raw water. The filtered water 110 is sent to a drainage treatment system of the invention to be mentioned later. The oil content and floc which accumulates over the rotary filter film 109 are removed from the rotary cylinder 111 by spraying cleaning water and scraping it off using a scraping plate 112, and they are discharged to outside of the rotary filter device 108.

The filtered water 110 is sent to either the adsorption tower 115a or 115b through a drainage supply tube 104. Although two adsorption towers are provided in the present invention, additional adsorption towers may be provided. The purpose of preparing two tanks is to carry out the adsorption treatment in one adsorption tower while carrying out the regeneration treatment in another adsorption tower, so that the drainage treatment can be performed continuously. Switching the adsorption towers is done by opening and shutting the valves 117a and 117b. Inorganic system adsorbents 116a and 116b are filled in the adsorption towers 115a and 115b, respectively. It is preferable that fine particles be used for the raw material of the absorbent in order to make the surface area of the adsorbent larger. Although the control of the fine particle is complicated because they flow out by the flowing water, it is easy to use them when they are molded in a certain shape and fired. The shape of the molded body may be a rod shape, a pellet shape, a cylinder shape, a honeycomb, or a net shape. It may be one where adsorbent fine particles are supported by a molded carrier. As a carrier having a honeycomb or a net shape, it is preferable that an inorganic material or a metal be used because of the requirement to endure repeated regeneration.

An analyzer 130 for analyzing the concentration of sodium in the drainage is connected with the drainage supply tube 104, and analyzers 140a and 140b for analyzing the concentration of sodium in the treated water are connected to the treated water exhaust pipes 121 and 122 at the outlet of the adsorption tower.

Heating elements 118a and 118b for heating adsorbent are provided in the adsorption towers 115a and 115b, and air blast tubes 120a and 120b are installed through the valves. The air blast tube is connected to the air supply device which is not shown in the figure. This heating device and air blast tube are used when the adsorbent in the adsorption tower is regenerated. That is, when the amount of adsorbed organic element in the adsorbent increases and the adsorptivity decreases, the adsorption operation is stopped once, air is blown in the adsorption tower through the air blast tube, the adsorbent is heated to a high temperature by using the heating element, and organic elements adsorbed on the adsorbent are burned and removed. At this time, the heating temperature is preferably controlled to be as low as possible in a range where the organic compounds can be burnt and removed because vitrification of the adsorbent progresses easily with increasing temperature. Concretely, the temperature is preferably 500° C. or less and, specifically, 400° C. or less is more preferable. When the regeneration process is carried out on the adsorbent, the valve 119a or valve 119b is kept closed, which is provided on the outlet side of the adsorption tower where the operation is performed.

In the analyzers 130, 140a, and 140b, sodium concentration is analyzed continuously or in a given time interval, and the analytical data are sent to the data gathering device 151 of the control device 150 through the communication line, etc. Data gathered in the data gathering device 151 are sent to the arithmetic unit 152. In the arithmetic unit 152, when data in the analyzer 130 and data in the analyzers 140a and 140b are compared, and when they become a given condition which is previously established, it is judged that the adsorbent is poisoned by sodium and dead, and signal is sent to close a valve where the adsorption operation is going on, that is, either valve 117a or 117b. The condition when the valves 117a and 117b are closed is the case when the sodium concentrations measured by the analyzers 140a and 140b are greater than the sodium concentration measured by the analyzer 130 as one example. Or, the sodium concentrations measured by the analyzers 140a and 140b become a predetermined ratio against the sodium concentration measured by the analyzer 130. An absorption spectrophotometer, an ion chromatography, and flame atomic absorption spectrometry, etc. can be used for the analyzers 130, 140a, and 140b.

When signal for closing the valve 117a or the valve 117b is sent by the control device 150 and the drainage supply to the adsorption tower is stopped, the adsorbent filled in the adsorption tower is exchanged or the treatment is carried out to remove the sodium. The function being performed in the control device 150 can be carried out by reading the program which has this function. Moreover, this function may be carried out by recording the program in the recording medium and reading it in the control device.

Next, various experimental results will be described.

Experiment 1

300 mL of oilfield produced water was put into a polyethylene reagent bottle, the adsorbent was put therein and corked tightly, and the oilfield produced water and the adsorbent were mixed by stirring by vibration of the reagent bottle for about 30 minutes. After that, the adsorbent was separated from the water by using filter paper and the rate of decrease in the COD element in water was analyzed. Measurement of the rate of the decrease in COD was carried out by the COD analysis method using potassium permanganate in the JIS K 0102 test method of industrial wastewater. Eight kinds of synthetic zeolite from No. 1 to No. 8, which are shown in Table 5 and had different silica/alumina molar ratios and specific surface areas were used for the adsorbent. Moreover, as oilfield produced water, two kinds of raw water, a first raw solution and a second raw solution shown in Table 4, were used. Acetic acid, propionic acid, butyric acid, valeric acid, succinic acid, lactic acid, acetone, methyl ethyl ketone, trichloroethylene, tetrachloroethylene, benzene, toluene, ethylbenzene, xylene, phenol, cresol, xylenol, hexachlorobenzene, and carbon disulfide, etc. are contained in these oilfield produced waters and all of them become factors which increase COD. The rate of COD decrease of the treated water is shown in Table 4. The higher the rate of decrease in the COD element, the more the amount of organic element adsorbed on the adsorbent, resulting in the amount of the organic element contained in the drainage after treatment being smaller.

TABLE 4

| Contents | First raw water Concentration (mg/L) | Second raw water Concentration (mg/L) |
| --- | --- | --- |
| NaCl | 36000 | 16000 |
| Acetic acid | 2000 | 120 |
| Propionic acid | 500 | 40 |
| Ketones | 3 | 10 |
| Phenols | 30 | 60 |
| Benzenes | <1.0 | <1.0 |
| $COD_{Cr}$ | 7500 | 1980 |

TABLE 5

| Zeolites | Rate of COD decrease (%) | | Silica/Alumina (molar ratio) | Specific surface area ($m^2/g$) |
| --- | --- | --- | --- | --- |
| | First raw water | Second raw water | | |
| No. 1 | 34.4 | 47.4 | 6 | 550 |
| No. 2 | 12.5 | 31.6 | 6 | 230 |
| No. 3 | 7.8 | 31.6 | 17 | 360 |
| No. 4 | 32.8 | 62.6 | 18 | 170 |
| No. 5 | 12.5 | 26.3 | 40 | 330 |
| No. 6 | 31.3 | 86.3 | 200 | 400 |
| No. 7 | 42.1 | 81.1 | 240 | 420 |
| No. 8 | 28.1 | 64.2 | 510 | 750 |

In zeolites No. 1 to 8, higher rates of COD decrease were obtained in the No. 6 zeolite and the No. 7 zeolite in either the first raw solution or the second raw solution. The silica/alumina molar ratio and specific surface area do not affect the rate of COD decrease.

Experiment 2

The second raw solution shown in Table 4 and the synthetic zeolite shown as No. 7 in Table 5 were put into a reagent bottle and mixing by stirring for one hour. After that, the second raw solution was exchanged for a new one and mixed by stirring for one hour and the exchange of raw solution was repeated five times, and then the adsorbent was taken out from the reagent bottle and heated to a high temperature. The heating temperature was changed four ways in the range from 120° C. to 700° C. Then, the specific surface area and the carbon content of the adsorbent were measured. The carbon content was measured by a high-frequency combustion infrared absorption method and the specific surface area was measured by a BET method.

TABLE 6

| | Sample | | | | |
| --- | --- | --- | --- | --- | --- |
| | Raw material | After use | After use | After use | After use |
| Heating temperature (° C.) | — | 120 | 300 | 500 | 700 |
| C content (weight %) | 0 | 0.3 | 0.28 | <0.01 | <0.01 |
| Specific surface area ($m^2/g$) | 390 | 385 | 390 | 395 | 390 |

In Table 6, what is shown as "raw material" means the state before using the experiment, and what is shown as "after use" means the state where adsorption and regeneration were repeated five times. When the heating temperature was 500° C. and 700° C., the residual carbon content in the adsorbent was extremely small and it became almost the same state as that before use. On the other hand, when the heating temperature was 120° C. and 300° C., the carbon content was large and the organic elements were not fully combusted, so that the ratio remaining therein became high. From these results heating it up to 500° C. or more is preferable to effectively burn off the organic elements. However, since the adsorbent is easily vitrified when the heating temperature becomes high, the heating temperature is preferably controlled to be as low as possible, and it is preferable that the organic elements be burned by supporting a catalytic element and heating at a temperature of 400° C. or less. 500° C. or less is preferable and, concretely, the most preferable temperature is in the range from 400 to 450° C.

The specific surface area almost does not change in the range of heating temperature from 120 to 700° C., and the effects of the heating temperature are small in this temperature range.

Experiment 3

Figure 4:
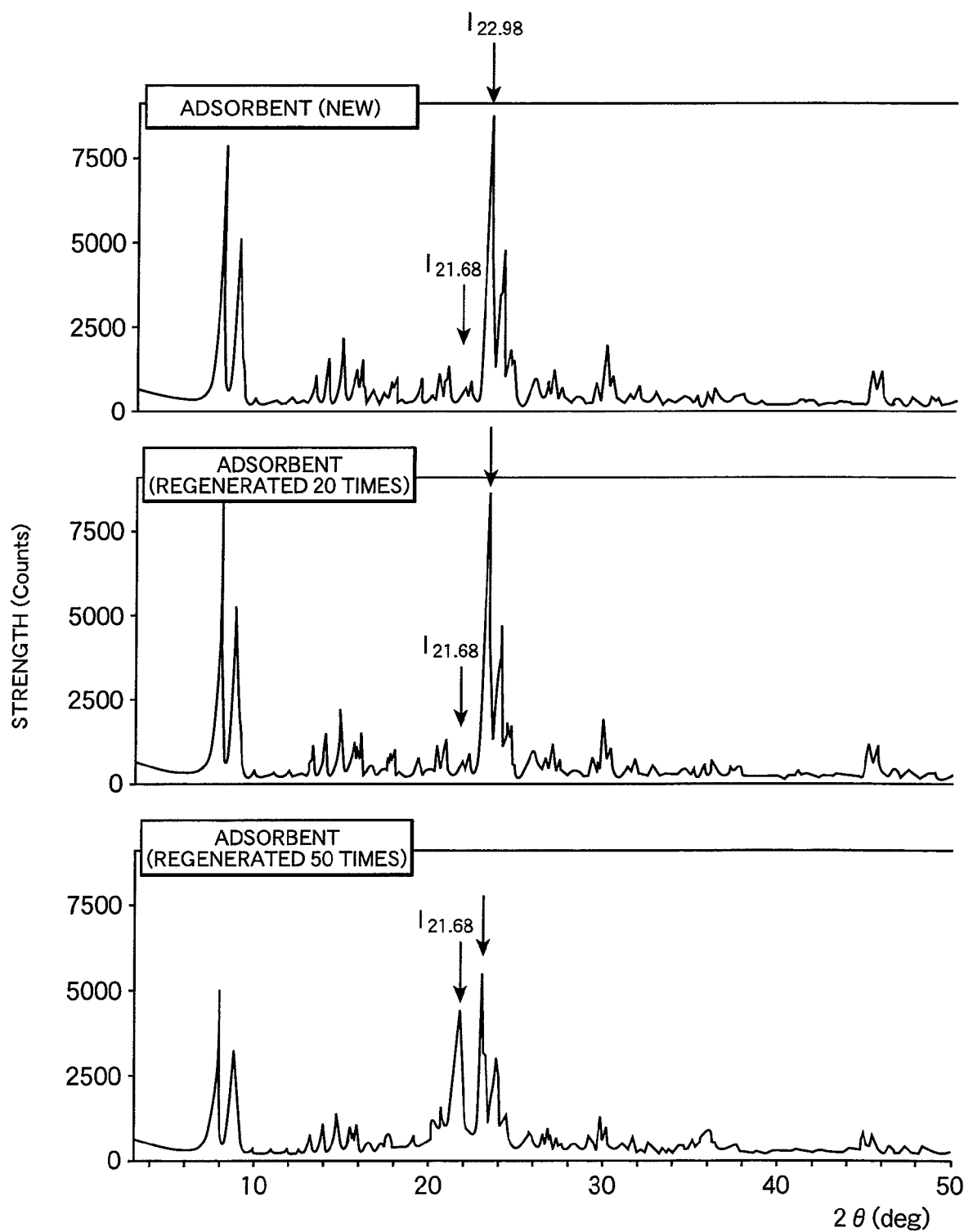
FIG. 4 shows X-ray diffraction patterns of an absorbent used in the present invention.

An experiment which repeats the adsorption and heat-regeneration was carried out by using synthetic zeolite as the adsorbent where the peak intensity of the X-ray diffraction pattern exists at 2θ=22.98° before adsorption as shown in FIG. 4. The experiment was carried out as follows; the adsorbent and the first raw liquid shown in Table 3 were put into a reagent bottle, it was mixed by stirring for one hour and taken out therefrom and regenerated by heating at 600° C., and the adsorbent was put into the reagent bottle with the new first raw solution and, after that, similar operations were repeated. FIG. 4 shows the X-ray diffraction peaks of the adsorbent before adsorption, that is, a new adsorbent, of the adsorbent where adsorption and heat-regeneration were carried out twenty times each, and of the adsorbent where adsorption and heat-regeneration were carried out fifty times each. Measurement of the X-ray diffraction pattern was done by using a powder X-ray diffraction method. In FIG. 4, the peak position of 2θ=22.98° means that this adsorbent includes $SiO_2$. When the adsorption and regeneration are repeated, another peak appears at the position of 2θ=21.68° and the intensity at this position becomes higher with increasing frequency of adsorption and regeneration. The position means that sodium exists, that is, it starts vitrifying. According to FIG. 4, the degree of vitrification increases with increasing frequency of adsorption and regeneration.

Figure 11:
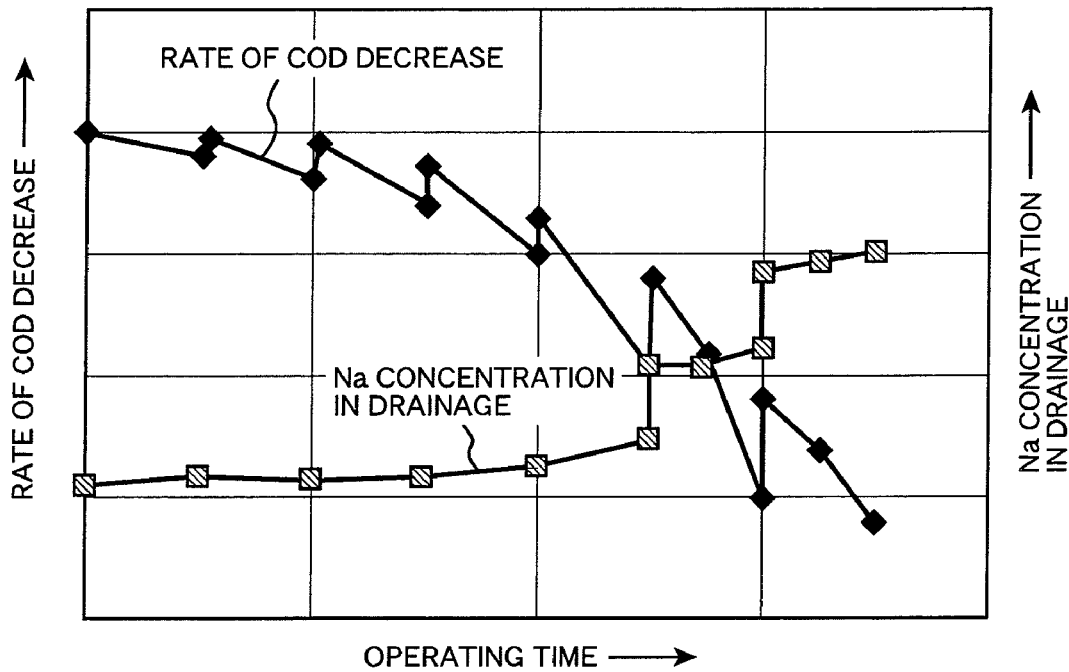
FIG. 11 is a graph illustrating a relationship between the operating time of the adsorbent and the rate of COD decrease of the treated water after the treatment.

FIG. 11 shows the rate of COD decrease in COD of the drainage after treatment and the change of the sodium concentration with increasing operating time of the adsorbent. The arrows in the figure mean that the value becomes greater while going in that direction, for instance, that the Na concentration in the drainage becomes higher. The interval between measurement points is about ten hours. Actually, since regeneration is performed with every one hour of adsorption, ten times adsorption and regeneration are carried out, respectively, in ten hours. It is understood that the rate of decrease in COD decreases with increasing operating time. On the other hand, the sodium concentration in the drainage increases with increasing operating time. Thus, it was confirmed that sodium accumulates in the adsorbent with increasing operating time and the adsorption removal rate of the organic elements decreases even when adsorption and regeneration were repeated. Therefore, measuring sodium concentration in the drainage before and after coming into contact with the adsorbent is extremely effective to judge the life of the adsorbent.

Sixth Embodiment

Figure 12:
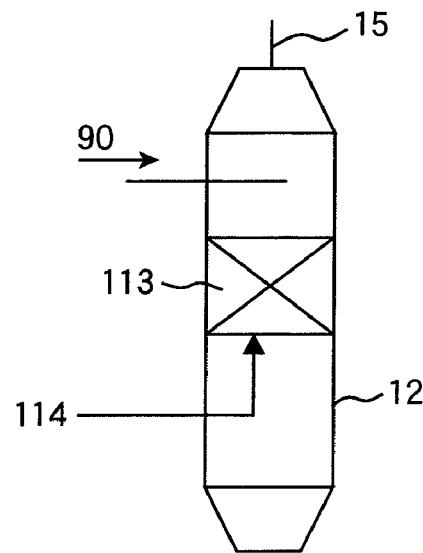
FIG. 12 is a schematic drawing illustrating a structure of an aeration tank arranged instead of an electric potential generation device and electrolytic bath.

Another embodiment of the present invention will be explained as follows referring to FIGS. 12 and 1. In the present invention, as shown in FIG. 12, electrolysis is not applied to the water to be treated and air 114 is supplied using a blower from underneath the filler 113 filled in the aeration tank 12, which is different from FIG. 1. Other points are the same as FIG. 1, so that same codes will be used to explain. A drainage treatment device 10 of the embodiment in the present invention includes a magnetic separation device 11 which separates the oil content in oilfield produced water, an aeration tank 12, a COD adsorption tank 17, and an exhaust combustion tower 16.

The operation of the drainage treatment device 10 will be explained as follows. First, oilfield produced water 1 is stored in a raw water tank 2. Oil is emulsified and dispersed in oilfield produced water. Extremely fine mud, sand, and other solid materials are included in oilfield produced water except for organic elements and sodium. Therefore, oilfield produced water 1 is sent to a coagulation tank 3 and a treatment where the suspended matter is allowed to aggregate to produce floc is carried out by using an adsorbent such as iron (II) sulfate and poly aluminum chloride, etc. and magnetic particles such as magnetite ($Fe_3O_4$) and γ-hematite ($Fe_2O_3$), etc. Raw water including the floc is sent to a rotary filter device 4 and the oil content is separated from the floc. A rotary filter film 5 and a rotary cylinder 6 are provided in the rotary filter device 4, and a magnetic field generation device such as an electromagnet is placed inside the rotary cylinder 6 though it is not shown in the figure. The raw water is filtered by the rotary filter film 5, and the oil content and floc 7 are separated from the raw water. The oil content and floc which accumulate over the rotary filter device 5 are removed from the rotary cylinder 6 by spraying cleaning water and scraping it off using a scraping plate 8, and they are discharged to outside of the rotary filter device 11.

The filtered water 90 is sent to the aeration tank 12. The filler 113 is filled in the tower in the aeration tank 12 and the blower 114 is placed to blow air from underneath the filler. After the filtered water 90 flows into the aeration tank 12, volatile organic elements are discharged from the exhaust pipe 15 which is placed at the top of the tower. The exhaust combustion tower 16 for burning and removing the volatile organic elements is placed at the tip of the exhaust pipe 15. According to the analysis, the volatile organic elements exhausted from the aeration tank 12 are ketones such as acetone, etc. and benzenes.

Elements which are difficult to volatilize in the filtered water 90 are sent to either the first COD adsorption tank 17 or the second COD adsorption tank 19 from the bottom of the aeration tank 12 as aerated processed water 180 through the drainage supply tube 18. This aerated processed water 180 is the second treated water. The COD adsorption tank includes a first COD adsorption tank 17 and a second COD adsorption tank 19. The first COD adsorption tank 17 is used for a regular operation and the second COD adsorption tank 19 is installed as a reserve. Therefore, the configurations of the first COD adsorption tank and the second COD adsorption tank are the same. The configuration of the whole adsorption tank will be described as follows referring to the first COD adsorption tank 17. Although two COD adsorption tanks are provided in the present invention, more adsorption tanks may be provided.

Particles of ZSM-5 which was a kind of synthetic zeolite were filled therein as the adsorbent 21. A catalytic element was supported beforehand on the particles of ZSM-5. In the case of this embodiment, Pt element was supported to be 0.2 wt % converted on the basis of aunit weight of ZSM-5. Mordenite has a similar adsorptivity as the element of the adsorbent 21 besides ZSM-5.

The container of the COD adsorption tank is formed of SUS 304 with a cylindrical shape. The material of the container of the COD adsorption tank is not limited to be SUS 304. The COD adsorption tank 17 is placed inside of the heating furnace 20 and it has a structure where the adsorbent 21 can be heated with the COD adsorption tank 17. A hot-air blower 22 and a drainage tube 23 are installed in the adsorption tank 17. The drainage tube 23 is placed at the bottom of the adsorption tank with the drain valve 24.

When the adsorptivity of the adsorbent is deteriorated, water in the COD adsorption tank 17 is drained by opening the drain valve 24. Next, inside of the COD adsorption tank 17 is dried. Hot-air of about 100 to 120° C. is blown into the COD adsorption tank 17 by operating the hot-air blower 22 to dry the adsorbent 21. A structure is preferable where air is blown from the upper part and exhausted while there is draining from the bottom of the COD adsorption tank.

The water content of the adsorbent 21 in the whole COD adsorption tank 17 was decreased to 10% or less by ventilating for about 30 minutes using the hot-air blower 22. The ventilation period depends on the tank length of the COD adsorption tank 17 and the ventilation temperature, so that it is not limited to this embodiment.

In order to control and manage the water content of the adsorbent, a moisture meter 29 may be provided in the ventilation tube 28 under the adsorption tank.

The treated water 25 passing through the COD adsorption tank 17 is discharged 28 after being stored in the reservoir 27 once. COD monitors 26 are provided before and after the reservoir and, especially, are used for management of the COD value (COD≦120 mg/L) of the drainage.

Although the aeration tank 12 was used in the aforementioned drainage treatment device 10, a vacuum distiller, an electrolytic device, or a hypochlorite reactor may be used instead of the aeration tank 12 according to the nature of the raw water.

Moreover, an electrolytic device may be installed in the fore part of the aeration tank 12, which is a separation removal device. At this time, the electrolytic device 14 and the aeration tank 12 may be combined with each other by providing the blower 114 in the part lower than the electrodes 91 and 92 of the electrodialysis device. Moreover, the aeration tank may be placed in the fore part and the electrolytic device may be placed in the aft part.

According to the present invention, since the regeneration process is included in order to maintain the adsorption ability of the adsorbent while the COD elements in oilfield produced water is adsorbed, removal for a long time becomes possible.

INDUSTRIAL APPLICABILITY

The present invention can be applied to a treatment to render oilfield produced water harmless, which is obtained by collecting crude oil from a mixture of crude oil and salt water mined in the oilfield etc., and the treated water can satisfy environmental standard regulations.

The invention claimed is:

1. A method for removing dissolved organic material in oilfield produced water comprising the steps of:
    bringing an adsorbent into contact with the oilfield produced water obtained by separating crude oil from a mixture of crude oil and salt water;
    adsorbing and removing a dissolved organic material in the oilfield produced water; and
    desorbing the material adsorbed from the adsorbent and regenerating the adsorbent,
    wherein the adsorbent is an inorganic adsorbent including $SiO_2$—$Al_2O_3$ or $SiO_2$—$Al_2O_3$—$Na_2O$ as a main element, and at least one of a noble metal and transition metal, and
    wherein at least two kinds of adsorbents with different pore sizes are included.

2. A method for removing dissolved organic material in oilfield produced water according to claim 1,
    wherein one kind of the adsorbents has a pore size of about 7 angstroms or less, and another kind of the adsorbents has a pore size of about 7 angstroms or more.

3. A method for removing dissolved organic material in oilfield produced water comprising the steps of:
    bringing an adsorbent into contact with the oilfield produced water obtained by separating crude oil from a mixture of crude oil and salt water;
    adsorbing and removing a dissolved organic material in the oilfield produced water; and
    desorbing the material adsorbed from the adsorbent and regenerating the adsorbent,
    wherein the adsorbent is an inorganic adsorbent including $SiO_2$—$Al_2O_3$ or $SiO_2$—$Al_2O_3$—$Na_2O$ as a main element and at least one of a noble metal and transition metal, and
    wherein air is supplied to an adsorbent layer for desorption.

4. A method for removing dissolved organic material in oilfield produced water comprising the steps of:
    bringing an adsorbent into contact with the oilfield produced water obtained by separating crude oil from a mixture of crude oil and salt water;
    adsorbing and removing a dissolved organic material in the oilfield produced water; and
    desorbing the material adsorbed from the adsorbent and regenerating the adsorbent,
    wherein the adsorbent is an inorganic adsorbent including $SiO_2$—$Al_2O_3$ or $SiO_2$—$Al_2O_3$—$Na_2O$ as a main element, and at least one of a noble metal and transition metal, and
    wherein the oilfield produced water is flown between electrodes to which an electric field is applied, and dissolved organic molecules in the oilfield produced water are decomposed before a contact-treatment of the adsorbent with oilfield produced water.

5. A method for removing dissolved organic material in oilfield produced water comprising the steps of:
    bringing an adsorbent into contact with the oilfield produced water obtained by separating crude oil from a mixture of crude oil and salt water;
    adsorbing and removing a dissolved organic material in the oilfield produced water; and
    desorbing the material adsorbed from the adsorbent and regenerating the adsorbent,
    wherein the adsorbent is an inorganic adsorbent including $SiO_2$—$Al_2O_3$ or $SiO_2$—$Al_2O_3$—$Na_2O$ as a main element and at least one of a noble metal and transition metal, and
    wherein a method of a drainage treatment for removing an organic element in said drainage by bringing the drainage containing an organic element and sodium into contact with the inorganic system adsorbent, and whether the drainage treatment using said inorganic system adsorbent is continued or not is judged on the basis of the sodium concentration in the drainage before coming into contact with said inorganic system adsorbent and the sodium concentration in the drainage after contacting with said inorganic system adsorbent.

6. A method for removing dissolved organic material in oilfield produced water according to claim 1,
    wherein said adsorbent is a proton type zeolite.

7. A method for removing dissolved organic material in oilfield produced water according to claim 5,
    wherein the drainage is treated by repeating the adsorption process for adsorbing an organic element onto said inorganic system adsorbent and a desorption process for desorbing the adsorbed organic element on said inorganic system adsorbent, the sodium concentration in the drainage before coming into contact with said inorganic system adsorbent and the sodium concentration in the drainage after contacting with said inorganic system adsorbent are measured in the process, and whether the drainage comes into contact with said inorganic system adsorbent or not is judged on the basis of both measured values.

8. A method for removing dissolved organic material in oilfield produced water comprising;
    an oil-water separation process where the oil content and undissolved particles floating and suspended in the oilfield produced water are removed,
    a process where dissolved organic material in treated water passing through said oil-water separation process is electrolyzed,
    a separation removal process where an organic element is separated and removed from a second treated water from the electrolytic process,
    an adsorption removal process where the organic element is adsorbed with an inorganic system adsorbent including $SiO_2$—$Al_2O_3$ or $SiO_2$—$Al_2O_3$—$Na_2O$ as a main element, and at least one of a noble metal and a transition metal, and thereby removed from a third treated water passing through said separation removal process, and a combustion process where a mixture of the organic element separated and removed in said separation removal process and the organic element separated and removed in said adsorption removal process is burned and exhausted.

9. A method for removing dissolved organic material in oilfield produced water according to claim 8,
   wherein the inorganic system adsorbent is used in said adsorption removal process, said inorganic system adsorption and removal agent after adsorbing and removing the organic element being used repeatedly by desorbing and regenerating at 380 to 600° C. in atmosphere.

10. A device for removing dissolved organic material in oilfield produced water comprising:
    a means for forming the oilfield produced water by separating crude oil from a mixture of crude oil and salt water,
    a means for holding an inorganic system adsorbent having adsorptivity for dissolved organic material in the oilfield produced water,
    a means for bringing said oilfield produced water into contact with said inorganic system adsorbent, wherein the adsorbent has an ability to adsorb the dissolved organic material and is an inorganic adsorbent including $SiO_2$—$Al_2O_3$ or $SiO_2$—$Al_2O_3$—$Na_2O$ as a main element, and at least one of a noble metal and a transition metal, and
    a means for regenerating the adsorbent on which said dissolved organic material is adsorbed, and
    which further comprises a microwave heating device for heating said adsorbent.

11. A system for removing dissolved organic material in oilfield produced water comprising:
    a means for forming the oilfield produced water by separating crude oil from a mixture of crude oil and salt water,
    a means for holding an inorganic system adsorbent having adsorptivity for dissolved organic material in the oilfield produced water,
    a means for bringing said oilfield produced water into contact with said inorganic system adsorbent, wherein the adsorbent has an ability to adsorb the dissolved organic material and is an inorganic adsorbent including $SiO_2$—$Al_2O_3$ or $SiO_2$—$Al_2O_3$—$Na_2O$ as a main element, and at least one of a noble metal and a transition metal, and
    a means for regenerating the adsorbent on which said dissolved organic material is adsorbed, and
    which further comprises a means for detecting the concentration of salt in salt water and a means for controlling said removal device on the basis of a signal from said detection means.

12. A system for removing dissolved organic material in oilfield produced water comprising;
    a drainage treatment system for removing dissolved organic material contained in the drainage by bringing the drainage including an organic element and sodium into contact with an inorganic system adsorbent, wherein the inorganic system adsorbent has an ability to adsorb the dissolved organic material and is an inorganic adsorbent including $Si_2O_2$—$Al_2O_3$ or $SiO_2$—$Al_2O_3$—$Na_2O$ as a main element, and at least one of a noble metal and a transition metal,
    wherein a control device is included in which supply of drainage to said inorganic system adsorbent is stopped on the basis of the sodium concentrations in the drainage to be contacted with said inorganic system adsorbent and in the drainage to be discharged from said inorganic system adsorbent.

13. A system for removing dissolved organic material in oilfield produced water according to claim 12,
    which further comprises an analyzer for analyzing the sodium concentration by collecting a part of the drainage to be contacted with said inorganic system adsorbent and an analyzer for analyzing the sodium concentration in the drainage which is discharged from said inorganic system adsorbent.

14. A system for removing dissolved organic material in oilfield produced water according to claim 13,
    wherein said control device comprises a data gathering device for gathering analytical data measured by said two analyzers and an arithmetic unit for sending a signal to stop the drainage supply to said inorganic system adsorbent on the basis of data accumulated in said data gathering device.

15. A system for removing dissolved organic material in oilfield produced water comprising;
    an oil-water separation tank where oil content and undissolved particles floating and suspended in drainage are removed,
    an electrolytic means where an organic element is decomposed in the drainage passing through the oil-water separation tank,
    a separation removal tank where the organic element is separated and removed from second treated water passing through said electrolytic means,
    an adsorption removal tank where the organic element is adsorbed in an inorganic system adsorbent and removed from third treated water passing through said separation removal tank, wherein the inorganic system adsorbent is an inorganic adsorbent including $Si_2O_2$—$Al_2O_3$ or $SiO_2$—$Al_{2O3}$—$Na_2O$ as a main element, and at least one of a noble metal and a transition metal, and
    a combustion chamber where the organic element separated and removed in the separation removal tank and the organic element separated and removed in the adsorption removal tank are mixed, burned, and exhausted.

16. A system for removing dissolved organic material in oilfield produced water according to claim 15,
    wherein, after the organic element is adsorbed and removed, the inorganic system absorbent is heated at 380° C. to 600° C. in atmosphere for regeneration and repeatedly used.

17. A system for removing dissolved organic material in oilfield produced water according to claim 15,
    wherein said oil-water separation tank also works as a magnetic separation tank and an electrolytic bath.

18. A system for removing dissolved organic material in oilfield produced water according to claim 15,
    wherein said inorganic system adsorbent includes silica and aluminum oxide and the ratio of silica and aluminum oxide is 5 or more as a $SiO_2/Al_2O_3$ molar ratio, and wherein the micro pores of the adsorbent has a three dimensional network structure.

19. A system for removing dissolved organic material in oilfield produced water according to claim 15,
    wherein said separation removal tank separates a volatile organic compound, which is removed by ventilating said second treated water.

* * * * *